US007827416B2

(12) United States Patent
Hanazaki

(10) Patent No.: US 7,827,416 B2
(45) Date of Patent: Nov. 2, 2010

(54) KEY MANAGEMENT APPARATUS, DOCUMENT SECURITY AND EDITING SYSTEM, AND KEY MANAGEMENT METHOD

(75) Inventor: Yoshihiko Hanazaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1183 days.

(21) Appl. No.: 11/202,152

(22) Filed: Aug. 12, 2005

(65) Prior Publication Data

US 2006/0047977 A1     Mar. 2, 2006

(30) Foreign Application Priority Data

Aug. 26, 2004   (JP)   ............................. 2004-246079

(51) Int. Cl.
G06F 12/14          (2006.01)

(52) U.S. Cl. .................. 713/193; 713/164; 380/277

(58) Field of Classification Search ................ 713/164, 713/193; 380/277
See application file for complete search history.

(56) References Cited

U.S. PATENT DOCUMENTS

| 5,818,933 | A | 10/1998 | Kambe et al. |
| 5,848,158 | A | 12/1998 | Saito et al. |
| 6,081,794 | A | 6/2000 | Saito et al. |
| 6,237,099 | B1 | 5/2001 | Kurokawa |
| 6,343,283 | B1 | 1/2002 | Saito et al. |
| 6,857,071 | B1* | 2/2005 | Nakae ........................ 713/156 |
| 7,350,238 | B2* | 3/2008 | Abe et al. ....................... 726/29 |
| 7,526,657 | B2* | 4/2009 | Saneto et al. ............... 713/193 |
| 2002/0019943 | A1* | 2/2002 | Cho et al. .................... 713/200 |
| 2002/0099947 | A1* | 7/2002 | Evans .......................... 713/193 |
| 2003/0233561 | A1* | 12/2003 | Ganesan et al. ............. 713/193 |
| 2004/0255138 | A1* | 12/2004 | Nakae .......................... 713/193 |

FOREIGN PATENT DOCUMENTS

| JP | 4-251353 A | 9/1992 |
| JP | 8-329011 A | 12/1996 |
| JP | 9-22352 A | 1/1997 |

(Continued)

*Primary Examiner*—Kambiz Zand
*Assistant Examiner*—Amare Tabor
(74) *Attorney, Agent, or Firm*—Birch, Stewart, Kolasch & Birch, LLP

(57) ABSTRACT

An objective is to provide a key management apparatus in a document security and editing system that controls and manages the usage rights of a document, allows a user with usage rights to read and edit freely according to user qualification, and manages the usage rights in compliance with document management rules established by an organization. The key management apparatus includes an encryption key memory 11 that stores an encrypted document identifier of an encrypted document and an encryption key of the encrypted document; a usage rights set memory 13b that stores the encrypted document identifier and usage rights; a user group determiner 18b that determines the usage rights of a user; a usage rights issuer 16 that receives a read request using the encrypted document identifier, refers to the encryption key memory and the usage rights set memory, and sends the usage rights and the encryption key of the encrypted document; and an encryption information issuer 17 that receives an edit request, refers to the encryption key memory and the usage rights set memory, instructs to generate an identifier of a document to be encrypted and a encryption key of the document to be encrypted, and sends the generated identifier and the generated encryption key.

18 Claims, 21 Drawing Sheets

FOREIGN PATENT DOCUMENTS

| | | |
|---|---|---|
| JP | 9-179768 A | 7/1997 |
| JP | 9218827 | 8/1997 |
| JP | 10-3429 A | 1/1998 |
| JP | 10055389 | 2/1998 |
| JP | 11149414 | 6/1999 |
| JP | 2000-48076 A | 2/2000 |

\* cited by examiner

Fig. 6

| USAGE RIGHTS SET IDENTIFIER | USER GROUP IDENTIFIER | USAGE RIGHTS (COMBINATION OF USAGE RIGHTS SET IDENTIFIER AND USER GROUP IDENTIFIER) |
|---|---|---|
| CLASS A | PERSON IN CHARGE (USER QUALIFICATION 1) | READ OK, PRINT OK, EDIT PROHIBITED, .... |
| CLASS A | HEAD OF SECTION (USER QUALIFICATION 2) | READ OK, PRINT OK, EDIT OK, .... |
| CLASS A | ... | ... |
| CLASS B | ... | ... |
| ... | ... | ... |

131 — USAGE RIGHTS SET IDENTIFIER
132 — USER GROUP IDENTIFIER
133 — USAGE RIGHTS
13b

Fig. 13

| USAGE RIGHTS MANAGEMENT APPARATUS IDENTIFIER | ADDRESS |
|---|---|
| USAGE RIGHTS MANAGEMENT APPARATUS 1 | ADDRESS 1 |
| USAGE RIGHTS MANAGEMENT APPARATUS 2 | ADDRESS 2 |
| ⋮ | ⋮ |

| USAGE RIGHTS MANAGEMENT APPARATUS IDENTIFIER | USER GROUP IDENTIFIER | ADDRESS |
|---|---|---|
| USAGE RIGHTS MANAGEMENT APPARATUS 1 | GROUP 1 | ADDRESS 1 |
| USAGE RIGHTS MANAGEMENT APPARATUS 2 | GROUP 2 | ADDRESS 2 |
| ⋮ | ⋮ | ⋮ |

| USAGE RIGHTS SET IDENTIFIER | USAGE RIGHTS |
|---|---|
| CLASS A | READ OK, PRINT OK, EDIT OK, · · · |
| CLASS B | READ OK, PRINT OK, EDIT PROHIBITED, · · · |
| CLASS C | READ OK, PRINT PROHIBITED, EDIT PROHIBITED, · · · |
| · · · | · · · |
| EXPORT 1 | READ OK, PRINT PROHIBITED, EDIT OK |
| EXPORT 2 | READ OK, PRINT OK, EDIT PROHIBITED |
| · · · | · · · |

13f

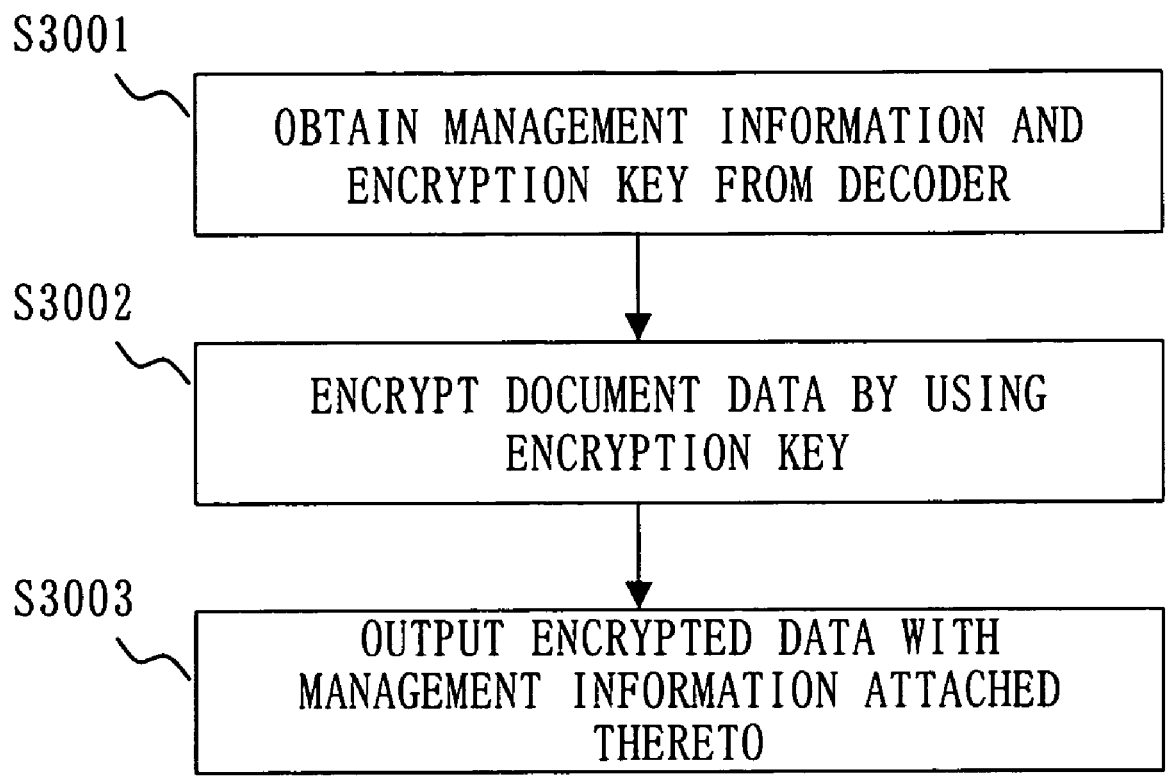

KEY MANAGEMENT APPARATUS, DOCUMENT SECURITY AND EDITING SYSTEM, AND KEY MANAGEMENT METHOD

BACKGROUND OF THE INVENTION

1. Field of the Invention

This invention relates to confidential information protection of an electronic document such as data in an electronic form, and also to usage rights management to read, view, and edit the electronic document and the like.

2. Description of the Related Art

In recent years, more and more business enterprises and the like are making active efforts to protect confidential information. More particularly, attention is currently focused on confidential information protection technology that prohibits third parties from reading and viewing a confidential document by encrypting a document and controlling the distribution of an encryption key.

Related art 1. Digital copyright management technology is a first possible related art applicable in order to implement the confidential information protection. However, the digital copyright management technology is designed to protect copyright in literary work and Detail Code. It is, therefore, only expected to quote information in protected documents without changing the contents. This means that the objective or idea of the digital copyright management technology is different from that of the confidential information protection. Accordingly, there is no way for the current digital copyright management technology to prohibit access to read protected documents.

Related art 2. Another possible conventional technology for confidential information protection, which is labeled Patent Document 1 below, has been proposed. Patent Document 1, entitled "System and method for distributing digital works, apparatus and method for reproducing digital woks, and recording medium", is configured with an editing apparatus to edit and encrypt document data, a ticket server apparatus for managing and distributing an encryption key and usage rights, and an audiovisual apparatus for reading and viewing a document. The audiovisual apparatus is allowed to decode and display the document data only when receiving the right ticket distributed. Then, the audiovisual apparatus, when receiving editing rights, is allowed to send decoded document data to the editing apparatus. The editing apparatus edits the document data to generate a new encrypted document, and sends the encryption key and usage rights to be registered in the ticket server apparatus.

[Patent Document 1] Japanese Unexamined Patent Publication No. 2000-48076

SUMMARY OF THE INVENTION

Confidential information in an electronic document has thus been protected and managed conventionally. The related art 1, as mentioned above, is not suitably designed for security protection. Also, with the related art 1, if the contents of information in an electronic document need to be amended or modified, the same data needs to be entered again. This would cause great inconvenience for the user in dealing with document data that involves frequent modifications or amendments of the contents.

With the related art 2, the contents can be amended or modified. However, all the usage rights and the users who are entitled to access a document need to be registered when the document is encrypted. Usually, the management of documents that have been prepared within an organization such as a business enterprise is subject to document management rules such as document classification. Then, users can access the documents according to the user's position, department and the like. Also, with related art 2, document creators specify individual users who can access documents they created. Therefore, it is requested that the document creators specify usage rights to the documents and users who can access the documents individually in line with the document management rules. Furthermore, the reading or viewing of the documents and the editing of the documents are managed in the same way. There is no problem with this management in terms of copyright management, but it is a problem in terms of the management of electronic documents in general.

Another problem is that the department of a user of a document may be changed while the document is effective. In this case, the usage rights to the document need to be specified and registered again. This can be a troublesome process.

The present invention is directed to solving problems such as those discussed above. It is an object of the present invention to provide a document security and editing system that controls and manages usage rights to documents. The document security and editing system allows the right users to have free access to read, view and edit confidential documents, just like dealing with open documents, according to job classification of the user. Also, the document security and editing system manages usage rights in line with document management rules established in an organization. It is another object of the present invention to provide a key management apparatus that is installed in the document security and editing system.

These and other objects of the embodiments of the present invention are accomplished by the present invention as hereinafter described in further detail.

According to one aspect of the present invention, a key management apparatus may include an encryption key memory that stores an encrypted document identifier of an encrypted document and an encryption key of the encrypted document, in which the encrypted document identifier and the encryption key correspond to each other. The key management apparatus may also include a usage rights set memory that stores the encrypted document identifier and usage rights, in which the encrypted document identifier and the usage rights correspond to each other. The key management apparatus may also include a user group determiner that determines the usage rights of a user. The key management apparatus may also include a usage rights issuer that receives a read request using the encrypted document identifier from the user who is given the usage rights set by the user group determiner, refers to the encryption key memory and the usage rights set memory, and sends the usage rights corresponding to the encrypted document identifier and the encryption key of the encrypted document to a terminal of the user from which the read request is received. The key management apparatus may also include an encryption information issuer that receives an edit request using the encrypted document identifier from the user who is given the usage rights set by the user group determiner, refers to the encryption key memory and the usage rights set memory, instructs to generate an identifier of a document to be encrypted and a encryption key of the document to be encrypted, stores a generated identifier and a generated encryption key in the encryption key memory and the usage rights set memory, respectively, and sends the generated identifier and the generated encryption key to the terminal from which the edit request is received.

According to another aspect of the present invention, a document security and editing system may include a key management apparatus and a document terminal. The key management apparatus includes an encryption key memory that stores an encrypted document identifier of an encrypted document and an encryption key of the encrypted document, in which the encrypted document identifier and the encryption key correspond to each other. The key management apparatus also includes a usage rights set memory that stores the encrypted document identifier and usage rights, in which the encrypted document identifier and the usage rights correspond to each other. The key management apparatus also includes a user group determiner that determines the usage rights of a user. The key management apparatus also includes a usage rights issuer that receives a read request using the encrypted document identifier from the user who is given the usage rights set by the user group determiner, refers to the encryption key memory and the usage rights set memory, and sends the usage rights corresponding to the encrypted document identifier and the encryption key of the encrypted document to the document terminal from which the read request is received. The key management apparatus also includes an encryption information issuer that receives an edit request using the encrypted document identifier from the user who is given the usage rights set by the user group determiner, refers to the encryption key memory and the usage rights set memory, instructs to generate an identifier of a document to be encrypted and a encryption key of the document to be encrypted, stores a generated identifier and a generated encryption key in the encryption key memory and the usage rights set memory, respectively, and sends the generated identifier and the generated encryption key to the document terminal from which the edit request is received. The document terminal includes a decoder that decodes the encrypted document by the encryption key corresponding to the encrypted document, a display and editor that displays and edits a decoded document by the decoder, and an encryptor that encrypts the decoded document edited by using the generated identifier and the generated encryption key obtained from the key management apparatus by the edit request.

According to still another aspect of the present invention, a key management method may include storing an encrypted document identifier of an encrypted document and an encryption key of the encrypted document, in which the encrypted document identifier and the encryption key correspond to each other. The key management method may also include storing the encrypted document identifier and usage rights, in which the encrypted document identifier and the usage rights correspond to each other. The key management method may also include determining the usage rights of a user. The key management method may also include receiving a read request using the encrypted document identifier from the user who is given the usage rights set by the user group determiner, referring to the encryption key memory and the usage rights set memory, and sending the usage rights corresponding to the encrypted document identifier and the encryption key of the encrypted document to a terminal of the user from which the read request is received. The key management method may also include receiving an edit request using the encrypted document identifier from the user who is given the usage rights set by the user group determiner, referring to the encryption key memory and the usage rights set memory, instructs to generate an identifier of a document to be encrypted and an encryption key of the document to be encrypted, storing a generated identifier and a generated encryption key in the encryption key memory and the usage rights set memory, respectively, and sending the generated identifier and the generated encryption key to the terminal from which the edit request is received.

The key management apparatus of this invention thus configured allows to manage usage rights to a document by the user class on a group basis. This allows for easy management of usage rights. This also allows for consistent management of usage rights with other departments such as a management department, an editing department, and a production department. The same effect may also be obtained by a document security and editing system that is provided with the key management apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 6 shows an example of information that is stored in a usage rights set memory according to the first embodiment;

FIG. 13 shows an example of information that is stored in a usage rights management apparatus memory according to the third embodiment;

FIG. 16 shows an example of information that is stored in another usage rights management apparatus memory according to the third embodiment;

FIG. 18 shows an example of information that is stored in a usage rights set memory according to a fourth embodiment of the present invention;

FIG. 21 is a flowchart illustrating an reencryption operation performed by a reencryptor according to the fourth embodiment.

DETAILED DESCRIPTION OF THE PREFERRED EMBODIMENTS

Figure 1:
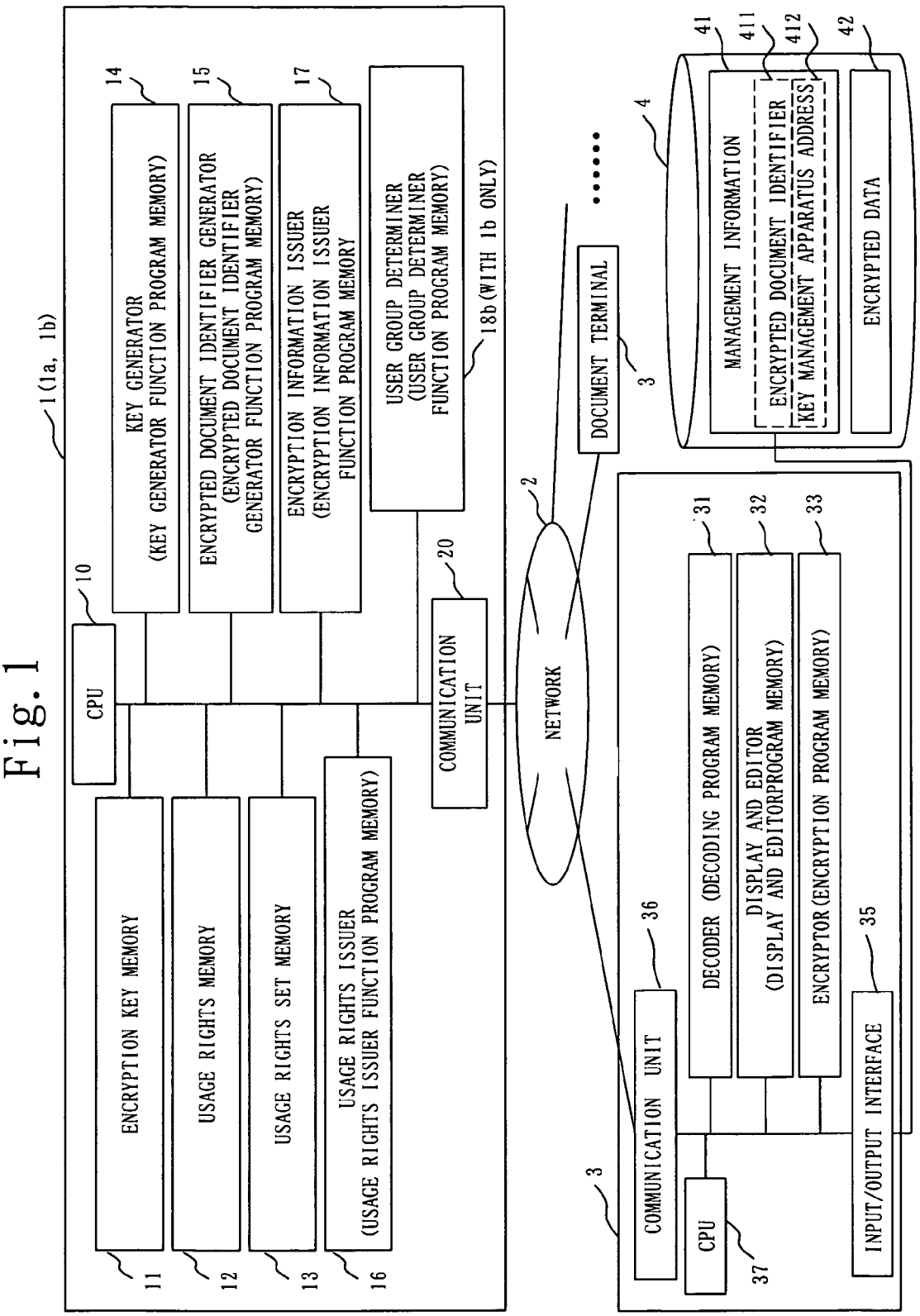
FIG. 1 is an overall view of a document security and editing system according to a first embodiment of the present invention illustrating element and terminal configurations thereof.

Reference will now be made in detail to the present preferred embodiments of the invention, examples of which are illustrated in the accompanying drawings, wherein like reference numerals indicate like devices through out the several views.

Embodiment 1

A document security and editing system and a key management apparatus installed therein will be described below. The document security and editing system is suitable for the management of reading, viewing and editing an electronic document in general. The document security and editing system provides sufficient protection for confidential information, and also provides flexible and easy integration with other systems.

FIG. 1 is an overall view of a document security and editing system according to a first embodiment of this invention. With reference to the figure, the document security and editing system includes a key management apparatus 1, a network 2, a plurality of document terminals 3, and encrypted documents 4. The document terminal 3 is connected to the key management apparatus 1 over the network 2. Also, the document terminal 3 is capable of inputting and outputting the encrypted document 4 that are distributed in an unspecified manner, via the network 2, a storage medium and the like. It is to be noted that the encrypted document 4 is stored in a variety of types of memories.

The key management apparatus 1 includes an encryption key memory 11, a usage rights memory 12, a usage rights set memory 13, a key generator 14, an encrypted document identifier generator 15, a usage rights issuer 16, and an encryption information issuer 17. The key generator 14, the encrypted document identifier generator 15, the usage rights issuer 16, and the encryption information issuer 17 are configured with a central processing unit (CPU) 10 and memories storing programs that are not shown in the figure. This is indicated by the parenthetical reference in the key management apparatus 1 of FIG. 1. More particularly, a usage rights issue function program, for example, is stored in a memory connected to an internal bus. Then, the central processing unit (CPU) 10 reads and executes the usage rights issue function program. The CPU 10 has functions to perform operations that will be discussed later with reference to FIG. 3 and FIG. 4. The encryption information issuer 17 and others are configured in the same manner as described above. Other elements like determiners and registers, which will be discussed in later embodiments, are also configured in the same manner as described here.

The document terminal 3 includes a decoder 31, a display and editor 32, an encryptor 33, an input/output interface 35, and a communication unit 36. The decoder 31, the display and editor 32, and the encryptor 33 are configured with processors and memories storing programs, respectively. The decoder 31, the display and editor 32, and the encryptor 33 are configured in the same manner as described above with reference to the key management apparatus of FIG. 1. For example, a central processing unit (CPU) 37 reads and executes a program including a function stored in a memory. The CPU 37 has functions to perform operations that will be elaborated later with reference to FIG. 3 and FIG. 4. It should be noted that the display and editor 32 can store the data of the encryption key memory 11, the usage rights memory 12, and the usage rights set memory 13 relating to the encrypted document 4 previously processed. Also, it is possible to determine whether to edit the encrypted document 4 or not by the usage rights set identifier.

The encrypted document 4 is stored in a storage unit. The encrypted document 4 includes management information 41 and encrypted data 42. The management information 41 includes an encrypted document identifier 411 and a key management apparatus address 412 (the address of a key management apparatus). The encrypted document 4 inputted or outputted to or from the document terminal 3 via the input/output interface 35 by the CPU 37. Or, the encrypted document 4 is exchanged with any other document terminal 3 and the like via the communication unit 36.

Figure 2A:
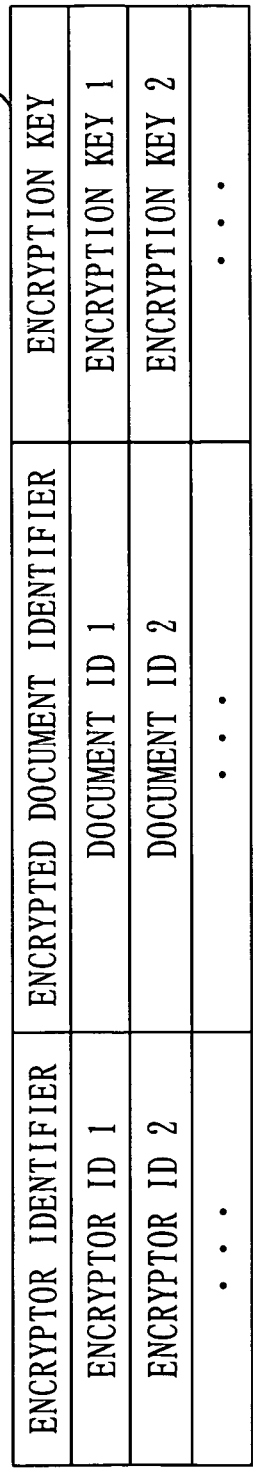
FIG. 2A shows an example of information that is stored in an encryption key memory 11 included in a key management apparatus according to the first embodiment.
Figure 2B:
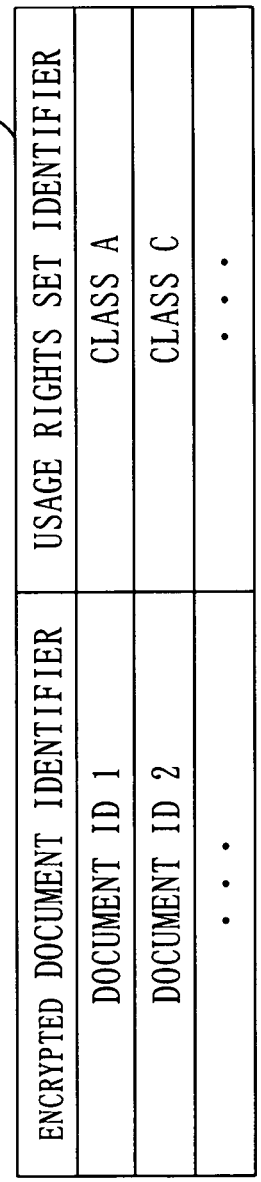
FIG. 2B shows an example of information that is stored in a usage rights memory 12 included in a key management apparatus according to the first embodiment.
Figure 2C:
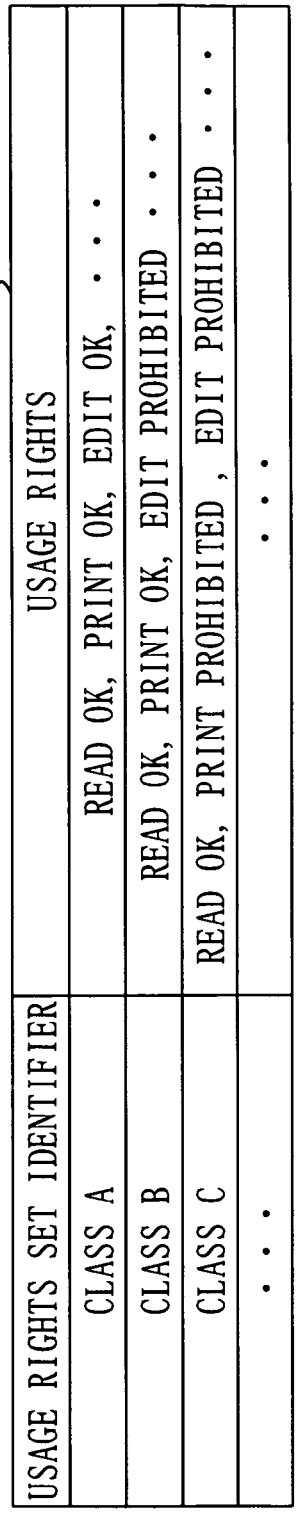
FIG. 2C shows an example of information that is stored in a usage rights set memory 13 included in a key management apparatus according to the first embodiment.

FIG. 2A shows an example of information that is stored in the encryption key memory 11. Specifically, the encryption key memory 11 stores an encrypted document identifier 411, an encryption key, an identifier of an individual who or organization which created the encrypted document 4 in a set. The set is provided for each encrypted document 4 such as Encrypted Document 1 and Encrypted Document 2. FIG. 2B shows an example of information that is stored in the usage rights memory 12. Specifically, the usage rights memory 12 stores the encrypted document identifier 411 and a usage rights set identifier in a set. The set is provided for each encrypted document 4. FIG. 2C shows an example of information that is stored in the usage rights set memory 13. Specifically, the usage rights set memory 13 stores the usage rights set identifier and usage rights in a set in advance. It should be noted that this embodiment introduces an example where document classification is used as the usage rights set. The usage rights are then established according to the document class. In general, the usage rights include document operation rights, such as read and view rights, print rights, edit rights, copy rights and the like, and the effective period and frequency of these rights.

An operation of this document security and editing system will now be discussed.

Figure 3:
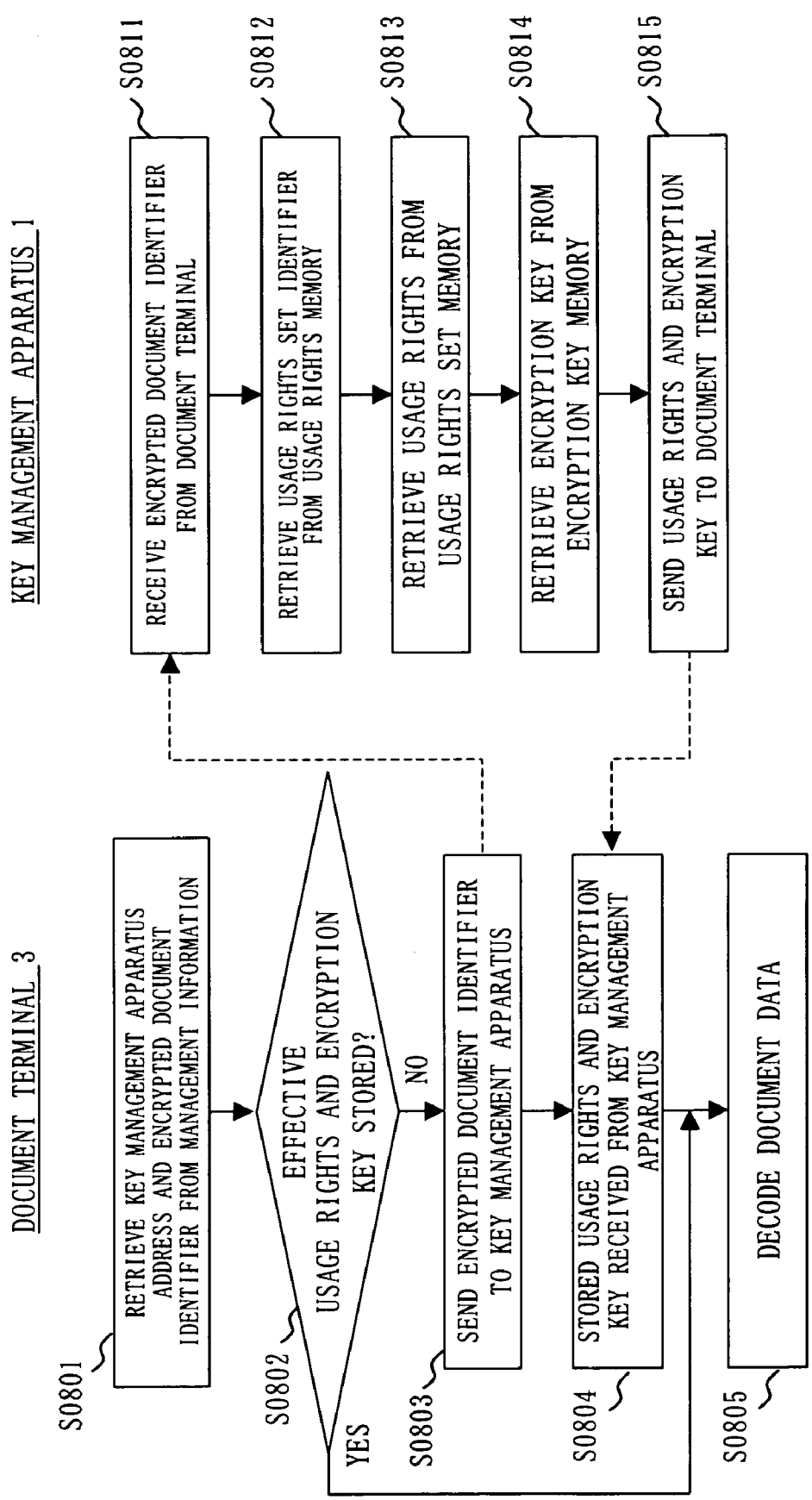
FIG. 3 is a flowchart illustrating an access operation to an encrypted document according to the first embodiment.

Firstly, an access operation to an encrypted document that is performed by the key management apparatus 1 and the document terminal 3 will be discussed with reference to FIG. 3. FIG. 3 is a flowchart illustrating operations of the key management apparatus 1 and the document terminal 3 for access to an encrypted document.

In order to read or view an encrypted electronic document, a user specifies an electronic document identifier (ID). Then, the decoder 31 of the document terminal 3 retrieves the encrypted document identifier 411 and the key management apparatus address 412 from the management information 41 of the encrypted document 4 in a step S0801 (hereinafter steps will be referred to without 'step'). Subsequently, in S0802, it is examined whether the usage rights and the encryption key corresponding to the encrypted document identifier 411 in the document terminal 3 are stored in the usage rights set memory 13 or the encryption key memory 11. If the usage rights and the encryption key are stored therein, and in addition the usage rights is effective, the process proceeds to S0805. In S0805, the encrypted document 4 is decoded and displayed by using the usage rights and the encryption key stored. In this case, no such communication as will be described below is involved with the key management apparatus.

If it is found in S0802 that the effective usage rights and the encryption key are not stored therein, the encrypted document identifier 411 is sent to the key management apparatus 1 in S0803. It should be noted that the access operation discussed above is employed also in each of the following embodiments. Specifically, the document terminal does not store data in the encryption key memory 11 and data in the usage rights set memory 13 corresponding to the encrypted document 4, but refers to the key management apparatus 1.

In S0811, the key management apparatus 1 receives the encrypted document identifier 411 from the document terminal 3. In S0812, the usage rights issuer 16 retrieves from the usage rights memory 12 a document class corresponding to the encrypted document identifier 411 received. In S0813, the usage rights issuer 16 also retrieves from the usage rights set memory 13 the usage rights corresponding to the document class. In S0814, the usage rights issuer 16 further retrieves from the encryption key memory 11 an encryption key corresponding to the encrypted document identifier 411 received. In S0815, the usage rights issuer 16 sends the usage rights retrieved and the encryption key retrieved to the document terminal 3 (to the address thereof).

In S0804, the document terminal 3 receives the usage rights and the encryption key from the key management apparatus 1, and stores therein the usage rights received and the encryption key received in correlation with the encrypted document identifier 411. In S0805, the document terminal 3 decodes the encrypted data 42 by using the encryption key received, and transfers the decoded document to the display and editor 32 together with the usage rights. The display and editor 32 controls operations for such as displaying, editing, and the like according to the usage rights. It should be noted that some encryption systems use different keys for encryption and decryption. With this and following embodiments of this type, it is assumed that the "encryption key" includes an encryption key and a decryption key.

Figure 4:
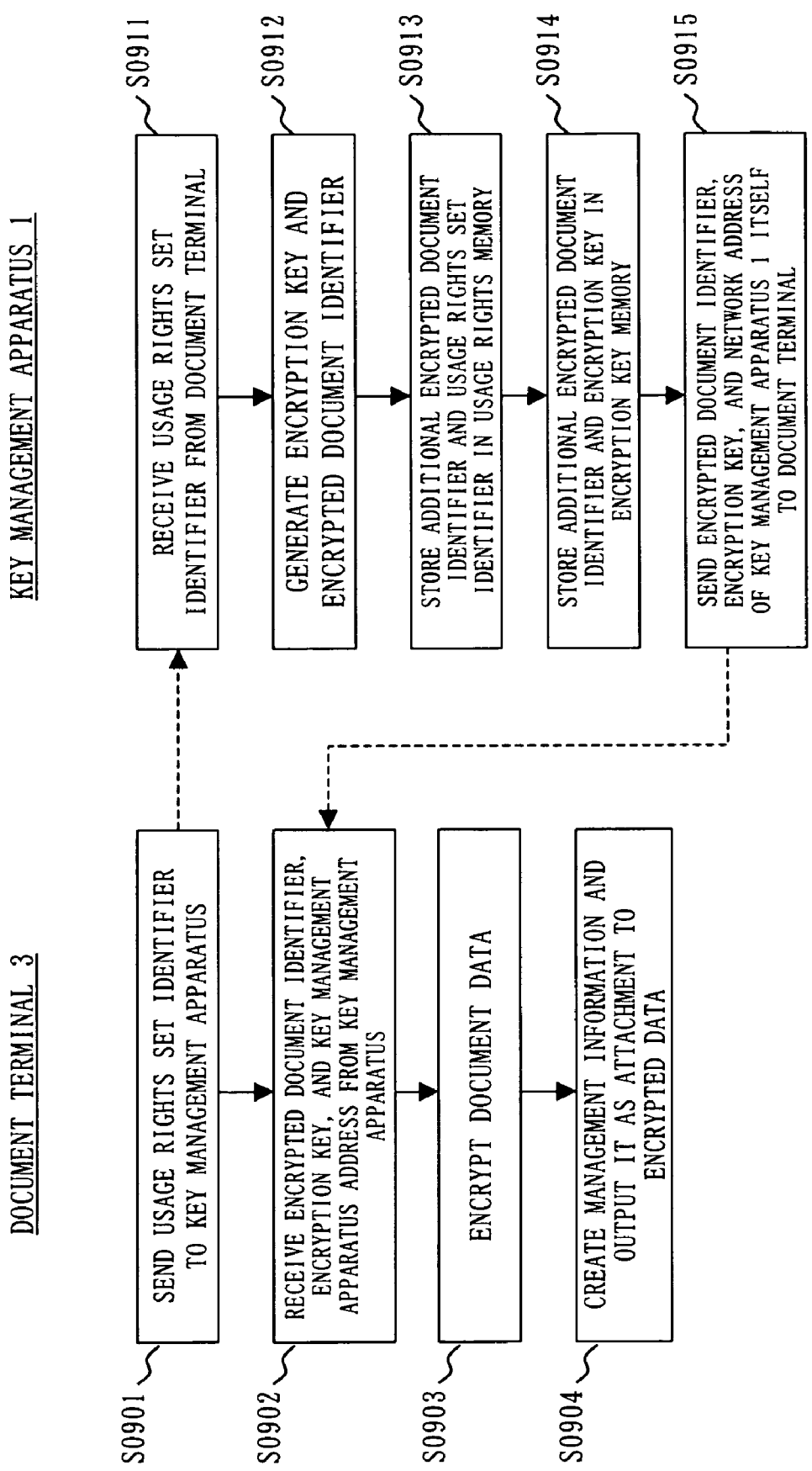
FIG. 4 is a flowchart illustrating an encryption operation of a document according to the first embodiment.

Secondly, an operation of the document security and editing system for creating an encrypted document will be discussed with reference to FIG. 4. FIG. 4 is a flowchart illustrating operations of the key management apparatus 1 and the document terminal 3 for the creation of an encrypted document.

The encryptor 33 of the document terminal 3, without edit rights, does not encrypt a document. Given edit rights, the encryptor 33 requests a user to specify the document class. When the user specifies the document class, the encryptor 33 transmits the document class specified to the key management apparatus 1 with the attachment of the identifier of an individual editor (editor ID) in S0901.

In S0911, the key management apparatus 1 receives the editor ID and the document class from the document terminal 3. In S0912, the encryption information issuer 17 instructs the key generator 14 to generate a new encryption key, and also instructs the encrypted document identifier generator 15 to generate a new encrypted document identifier 411. In S0913, the encryption information issuer 17 stores the data of the newly generated encrypted document identifier 411 and the document class received in the usage rights memory 12. In S0914, the encryption information issuer 17 stores the data of the new encrypted document identifier 411, the new encryption key, and the individual identifier (editor ID) in the encryption key memory 11. In S0915, the encryption information issuer 17 transmits the new encrypted document identifier 411, the new encryption key, and the network address of the key management apparatus 1 itself to the document terminal 3.

In S0902, the document terminal 3 receives the encrypted document identifier 411, the encryption key, and the address of the key management apparatus 1 from the key management apparatus 1. In S0903, the document terminal 3 encrypts document data by using the encryption key received. In S0904, the document terminal 3 outputs encrypted document data to a storage unit and the like that is to store the encrypted document 4 with the attachment of the management information 41 that is created based on the encrypted document identifier 411 received and the address of the key management apparatus received.

As described above, the use of the key management apparatus 1 allows controlling the usage rights to the encrypted document 4 according to document management rules, such as usage rights set identifiers of Class A, Class B, and Class C shown in FIG. 2C. With edit rights being given, the document terminal 3 can edit document data freely. In addition, if a document management rule has changed, all that is needed is to change the contents of the usage rights set memory 13. There is no need to go through the troublesome process of reregister for the usage rights for each individual user.

It is also possible to control the usage rights by the document type by establishing document types, such as technical document, design document, and sales and marketing document, as the usage rights set. This allows good consistency with systems dealing with technical documents, design documents and sales and marketing documents and the like, as well, as easy management.

In addition, the encryptor or encryption department of a document, and the editor or editing department of a document can be managed. This clarifies the responsibility of a person or department that corresponds to an encrypted or edited document, which can provide efficient document management.

In the above mentioned cases, usage rights are managed only by the usage rights set that is given to the encrypted document 4. It is different from the type of access management that is control by users. Another type of usage rights control will be discussed below. According to this type of usage rights control, usage rights are controlled by the right, such as user qualification, which is given to a group to which the user belongs.

Figure 5:
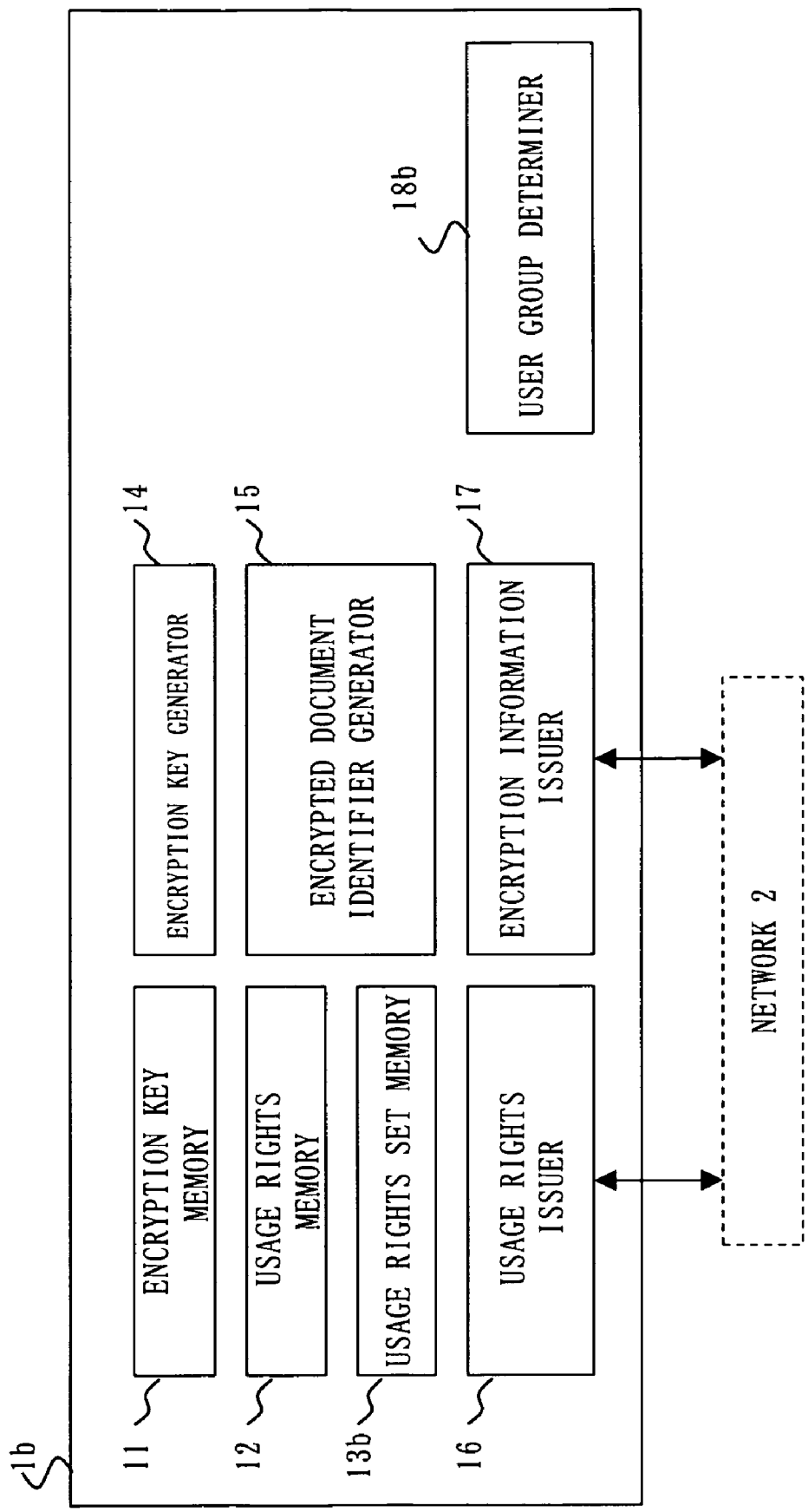
FIG. 5 is a block diagram illustrating the configuration of another key management apparatus according to the first embodiment of the present invention.

FIG. 5 is a block diagram of another key management apparatus 1b according to the first embodiment. The key management apparatus 1b is provided with a user group determiner 18b. The user group determiner 18b determines a user group to which a user belongs based on a user identifier. FIG. 6 is a diagram illustrating usage rights sets that are stored in a usage rights set memory 13b. With referring to FIG. 6, usage rights 133 are determined based on a usage rights set identifier 131 and a user group identifier 132. With this example, document class is employed as the usage rights set, and user qualification such as person in charge, head of section, and head of department, which may be set by job regulation, is employed as the user group. With design documents, for example, person in charge of design, person responsible for design, person of production department may be employed as user qualification. The user qualification may be determined by the right to handle documents: person with read and view rights, person in Class 1, person in Class 2 and the like.

Other elements in the overall configuration of the document security and editing system, other elements of the document terminal 3, and other elements of the key management apparatus 1*b* are the same as those discussed above, and therefore will not be elaborated here.

Figure 7:
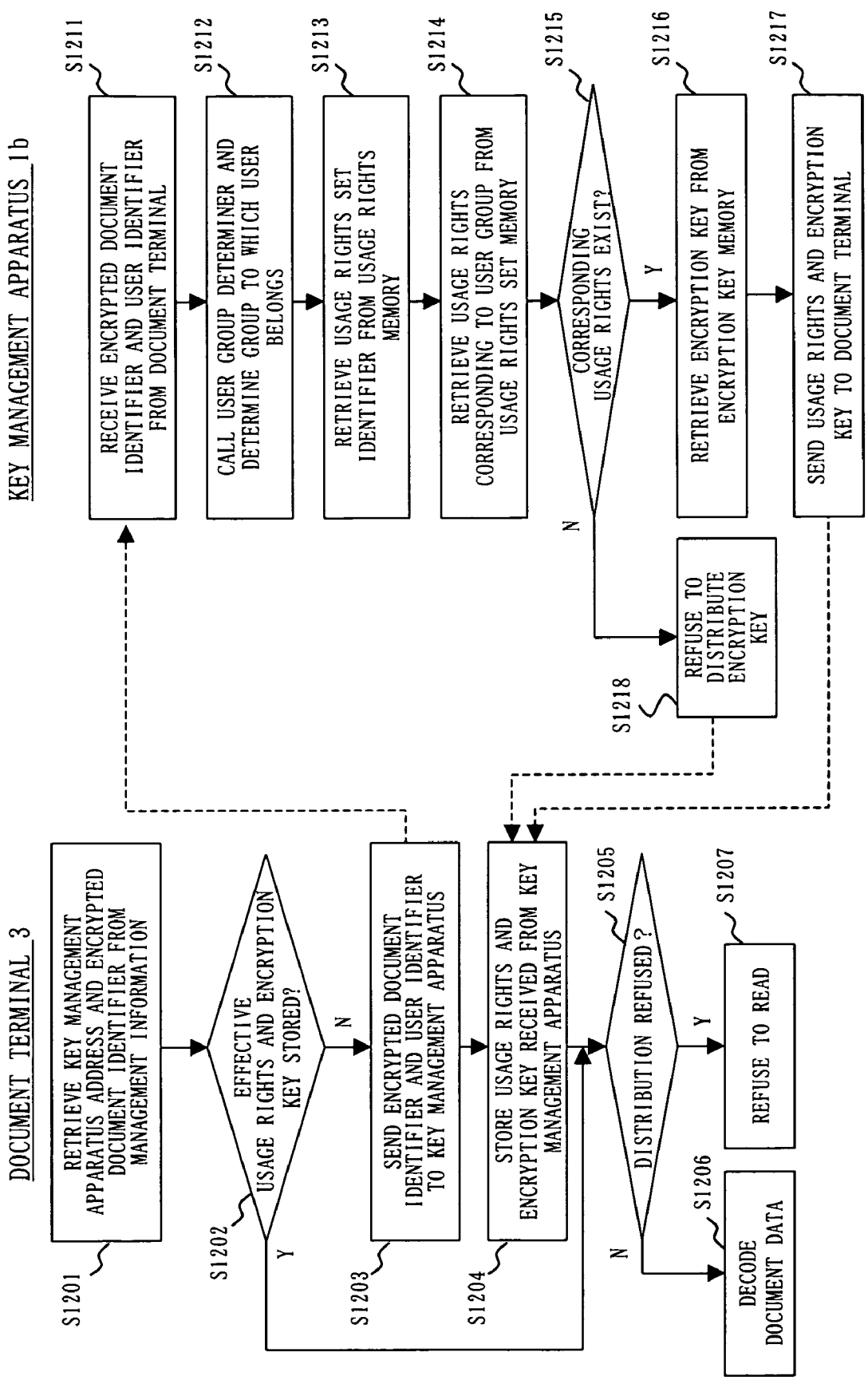
FIG. 7 is a flowchart illustrating another access operation to an encrypted document according to the first embodiment.

An access operation to the encrypted document 4 that is performed by the key management apparatus 1*b* and the document terminal 3 will be discussed with reference to FIG. 7. FIG. 7 is a flowchart illustrating operations of the key management apparatus 1*b* and the document terminal 3 for access to the encrypted document 4.

With referring to the figure, the decoder 31 in the document terminal 3 receives an instruction to access the encrypted document 4 from a user. Then, in S1201, the decoder 31 retrieves the encrypted document identifier 411 and the key management apparatus address 412 from the management information 41 of the encrypted document 4. In S1202, the decoder 31 examines whether or not usage rights and an encryption key corresponding to the encrypted document identifier 411 are stored. In the case where effective usage rights and an encryption key has been stored, the decoder 31 decodes document data using the usage rights stored and the encryption key stored, and displays decoded data in S1206. If neither of the effective usage rights nor the encryption key have been stored, the decoder 31 requests the user to enter the user group identifier 132, and sends it to the key management apparatus 1*b* together with the encrypted document identifier 411 in S1203.

In S1211, the key management apparatus 1*b* receives the encrypted document identifier 411 and the user group identifier 132 from the document terminal 3. In S1212, the key management apparatus 1*b* transfers the user group identifier 132 received to the user group determiner 18*b* to determine the user qualification. In S1213, the key management apparatus 1*b* retrieves from the usage rights memory 12 the document class corresponding to the encrypted document identifier 411 received usage rights. In S1214, the key management apparatus 1*b* retrieves from the usage rights set memory 13*b* the usage rights 133 corresponding to the document class and the user qualification. If the usage rights 133 does not exist the corresponding user qualification in the usage rights set memory 13*b*, the key management apparatus 1*b* prohibits distributing the encryption key in S1218.

If the user qualification exists in S1215, the key management apparatus 1*b* retrieves from the encryption key memory 11 the encryption key corresponding to the encrypted document identifier 411 received, in S1216. In S1217, the key management apparatus 1*b* sends the usage rights 133 and the encryption key retrieved to the document terminal 3.

In S1204, the document terminal 3 stores therein the usage rights 133 and the encryption key received from the key management apparatus 1*b* in correspondence to the encrypted document identifier 411. In S1206, the document terminal 3 decodes encrypted data 42 by using the encryption key received. If the key management apparatus 1*b* prohibits distributing the encryption key, the document terminal 3 prohibits its access to the encrypted document 4 in S1207.

As described above, the user qualification based usage rights control can be achieved if the usage rights are thus set out on a user group basis by the user qualification such as person in charge, head of section, and head of department. In addition, user's usage rights are set on the basis of organizational attribute. Therefore, in a personnel reshuffle, it is not required to register usage rights again for each user.

It should be noted that the user group determiner 18*b*, as mentioned above, is allowed to have an independent user management, or make a request to an external user management system for the qualification, department and the like of the user.

It is also possible to set departments, as user groups, to which users belong. In this case, the usage rights may be managed and controlled according to the department of the user.

It is also possible to use the network address of a user terminal as the user identifier and a network mask as the user group identifier. In this case, the usage rights can be controlled according to the physical arrangement of the user terminal. For example, edit rights can be given to the user terminal only when it is in a physically secured environment or room.

Embodiment 2

With reference to the first embodiment, the usage rights are determined when a document is encrypted. Now, a second embodiment introduces a case in which a usage rights set can be specified according to the type of encrypted document.

Figure 8:
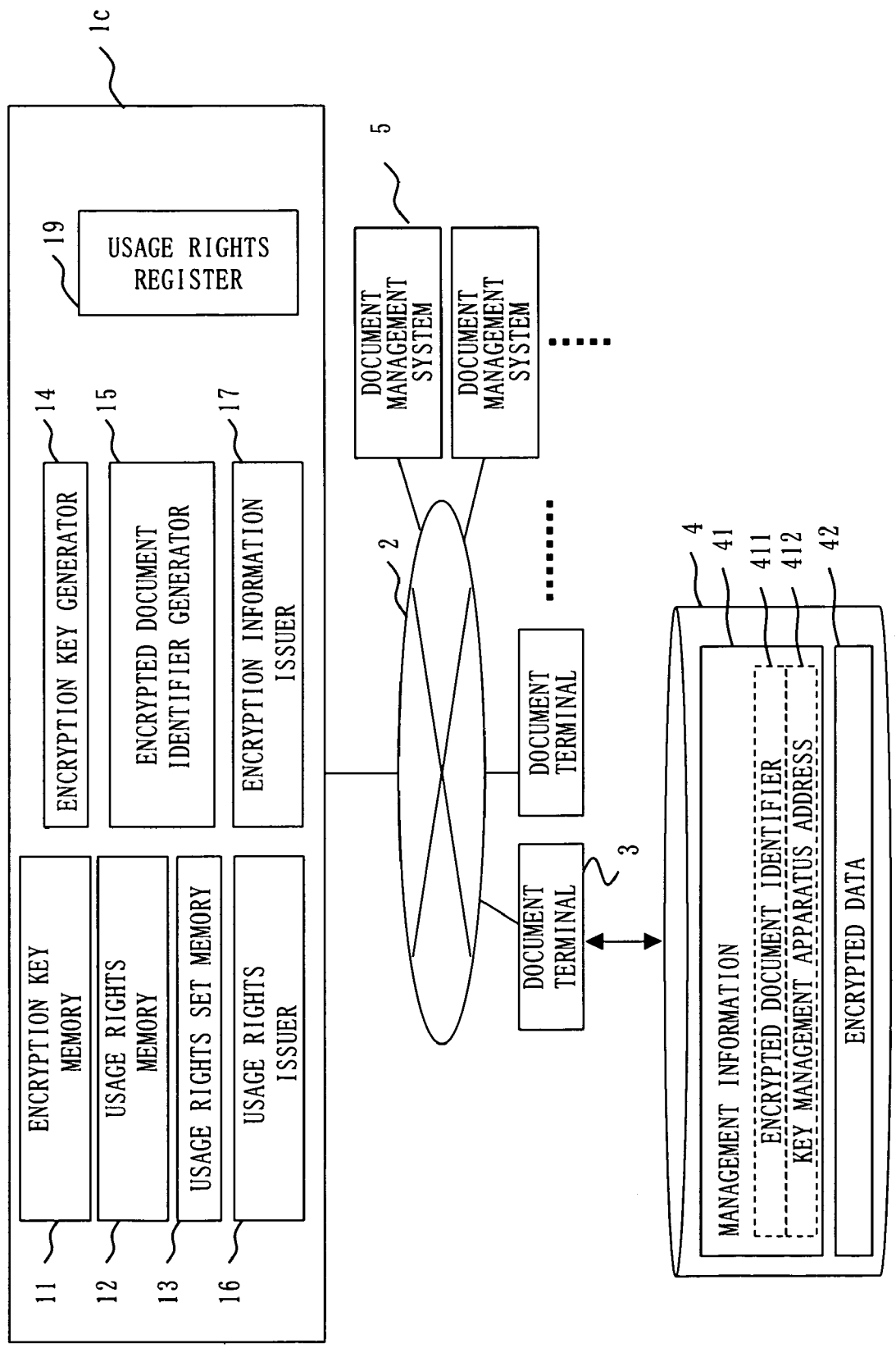
FIG. 8 is an overall view of a document security and editing system according to a second embodiment of the present invention, illustrating element and terminal configurations thereof.

FIG. 8 is an overall view of a document security and editing system of this embodiment. Specifically, one or more document management systems 5 are connected to a key management apparatus 1*c* over a network 2. FIG. 8 also shows the configuration of the key management apparatus 1*c* according to this embodiment. Specifically, the key management apparatus 1*c* is provided with a usage rights resister 19, and connected to the document management system 5 over the network 2. Other elements shown in FIG. 8 are the same as those of FIG. 1 discussed with reference to the first embodiment, and therefore will not be elaborated here.

Figure 9:
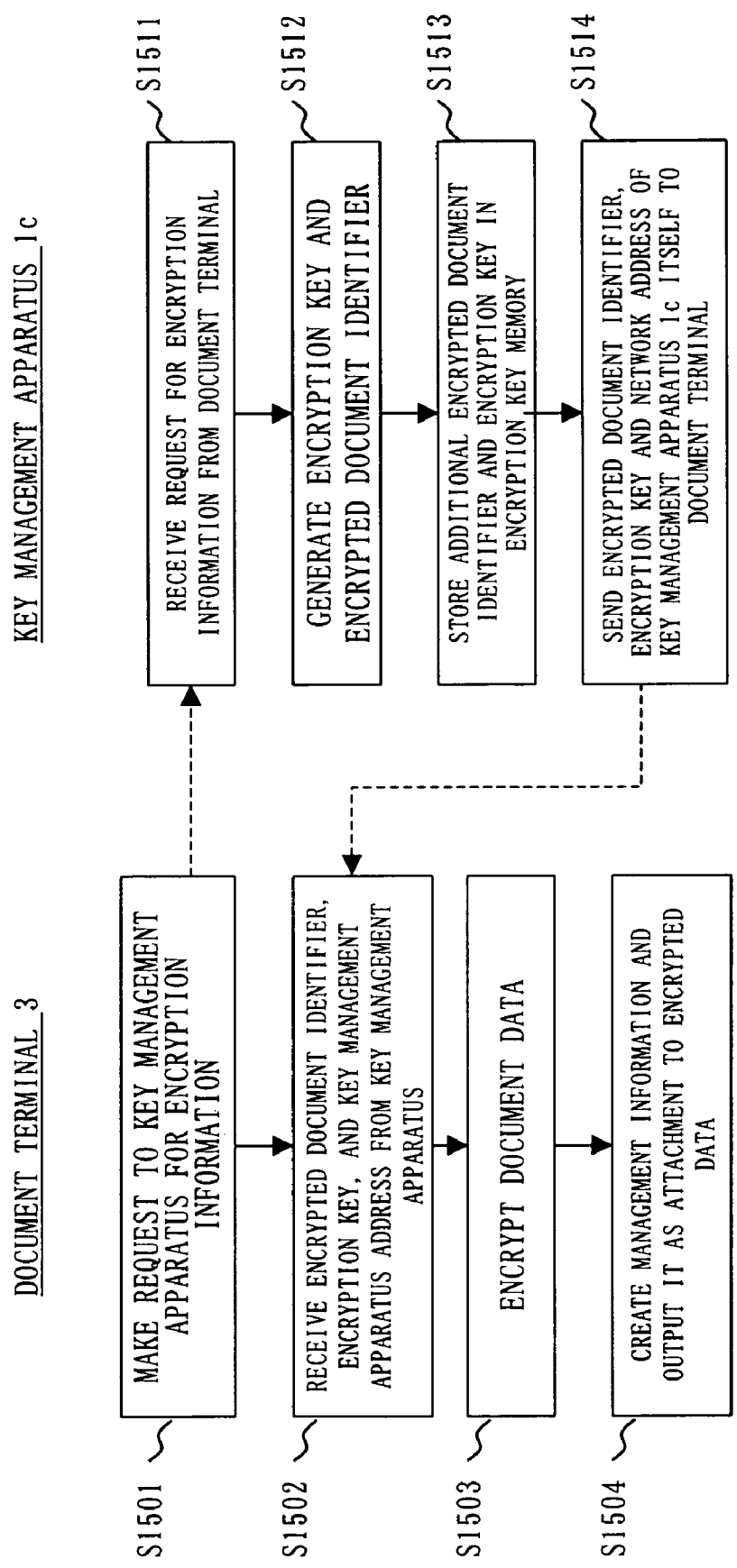
FIG. 9 is a flowchart illustrating an encryption operation of a document according to the second embodiment.

An encryption operation of a document will now be discussed with reference to FIG. 9. FIG. 9 is a flowchart illustrating operations of the key management apparatus 1*c* and a document terminal 3.

An encryptor 33 of the document terminal 3, upon receipt of an encryption instruction from a user, prohibits encryption of a document if edit rights of the encrypted document 4 is not given. If edit rights is given, the encryptor 33 makes a request to the key management apparatus 1*c* for encryption information in S1501.

In S1511, the key management apparatus 1*c* receives an encryption information request from the document terminal 3. In S1512, the key management apparatus 1*c* calls a key generator 14 to generate a new encryption key, and also calls a encrypted document identifier generator 15 to generate a new encrypted document identifier 411. In S1513, the key management apparatus 1*c* stores the new encryption key and the encrypted document identifier 411 in an encryption key memory 11. In S1514, the key management apparatus 1*c* sends the new encryption key, the new encrypted document identifier 411, and the network address of the key management apparatus 1*c* itself to the document terminal 3.

In S1502, the document terminal 3 receives the new encrypted document identifier 411, the new encryption key, and the address of the key management apparatus 1c from the key management apparatus 1c. In S1503, the document terminal 3 encrypts document data using the new encryption key received. In S1504, the document terminal 3 outputs encrypted document data to a storage unit and the like with the attachment of the management information 41 that is generated by the encrypted document identifier 411 and the key management apparatus address 412.

Figure 10:
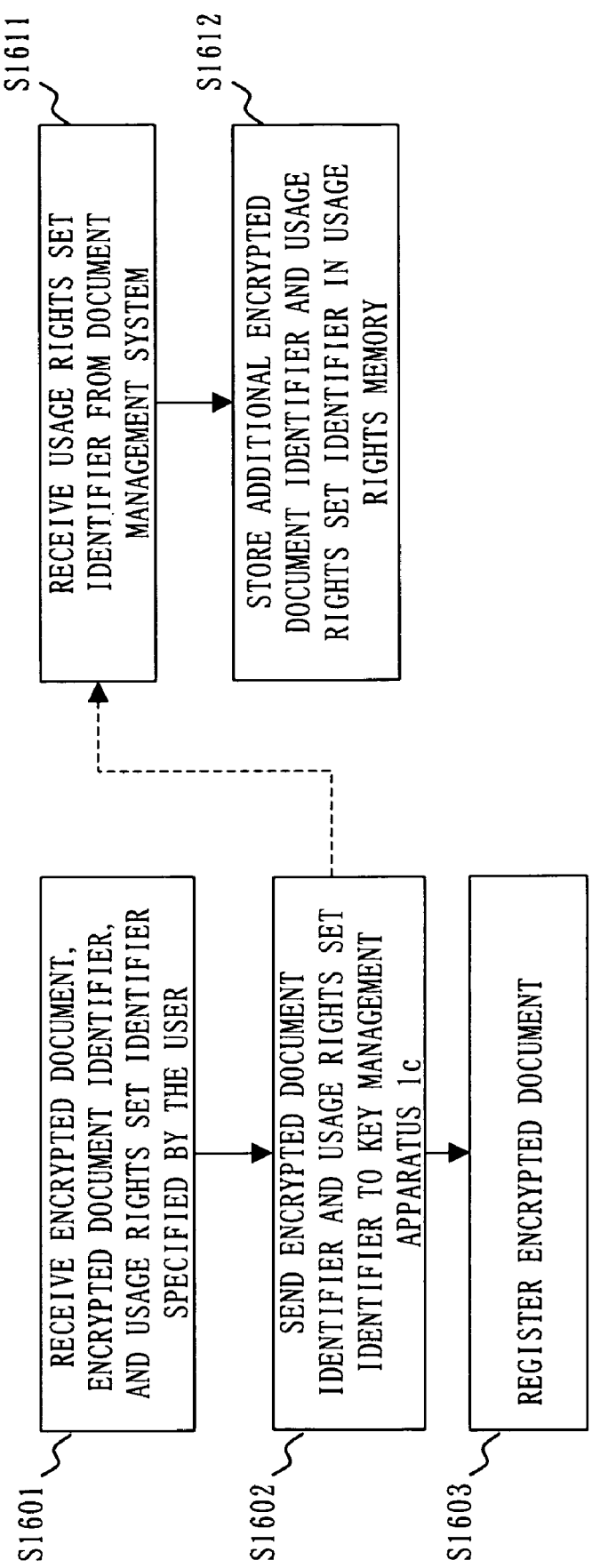
FIG. 10 is a flowchart illustrating a registration operation of an encrypted document according to the second embodiment.

A register operation of the encrypted document 4 in the document management system 5 will now be discussed with reference to FIG. 10. FIG. 10 is a flowchart illustrating operations of the document management system 5 and the key management apparatus 1c for the registration of a document.

A user starts registering the encrypted document 4 with the document management system 5 corresponding to the contents of the encrypted document 4. The user sends a register instruction to the document management system 5. The document management system 5 receives this instruction. Then, the document management system 5 requests the user to specify the encrypted document 4 (name), an encrypted document identifier 411, and a usage rights set identifier in S1601. It should be noted here that the usage rights set identifier be the one corresponding to a document type that is managed by the document management system 5. In S1602, the document management system 5 sends an encrypted document identifier 411 and a usage rights set identifier that are specified by the user to the key management apparatus 1c.

In S1611, the key management apparatus 1c receives the encrypted document identifier 411 and the usage rights set identifier. In S1612, the key management apparatus 1c stores the encrypted document identifier 411 and the usage rights set identifier received in a usage rights memory 12.

As discussed above, the document management system 5 can be used independently by the type of document, such as design document, technical specification, and sales and marketing document. In addition, an independent control of usage rights can be achieved for each document management system.

With the document and editing system of FIG. 8 discussed above, users who are given edit rights are allowed to set new usage rights for encrypting a document as they like. Next introduces an example of controlling usage rights such that the scope of the usage rights of a newly encrypted document does not go beyond the scope of the usage rights of the original encrypted document.

The configuration of the document security and editing system of this example is the same as that of FIG. 8 discussed above, and therefore will not be elaborated here.

Figure 11:
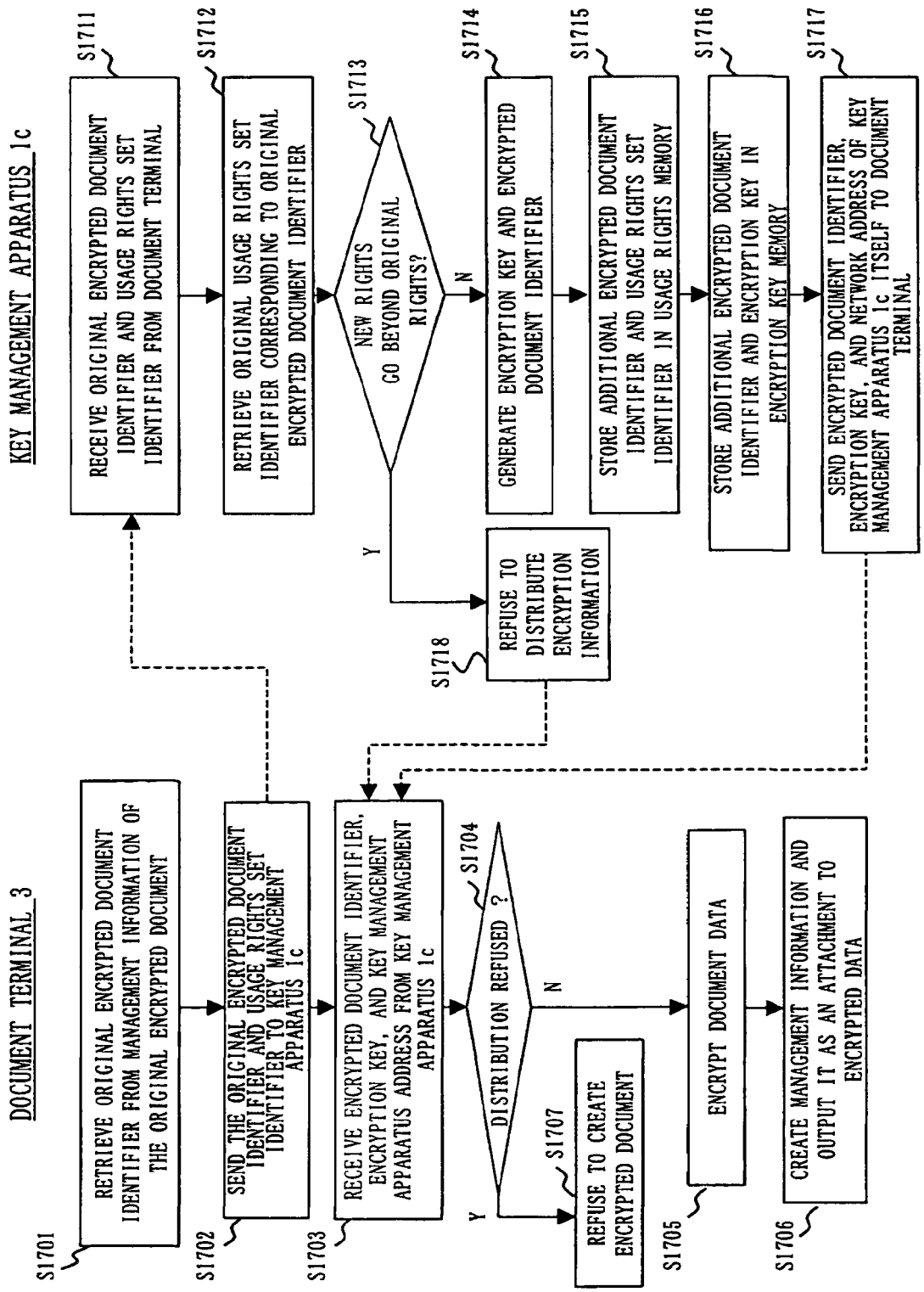
FIG. 11 is a flowchart illustrating another encryption operation of a document according to the second embodiment.

An encryption operation of a document will be discussed below with reference to FIG. 11. FIG. 11 is a flowchart illustrating operations of the key management apparatus 1c and the document terminal 3 for the encryption of a document.

The encryptor 33 in the document terminal 3, upon receipt of the instruction from a user, prohibits encryption of a document if edit rights of the encrypted document 4 are not given. If edit rights are given, then the encryptor 33 obtains an encrypted document identifier 411 from a decoder 31 in S1701. The encrypted document identifier 411 was read when the original encrypted document was decoded. In S1702, the encryptor 33 requests the user to specify a usage rights set identifier, and sends to the key management apparatus 1c a usage rights set identifier and the encrypted document identifier 411 of the original encrypted document that are specified by the user.

In S1711, the key management apparatus 1c receives the usage rights set identifier and the encrypted document identifier 411 of the original encrypted document from the document terminal 3. In S1712, the key management apparatus 1c retrieves a usage rights set identifier corresponding to the encrypted document identifier 411 of the original encrypted document from the usage rights memory 12. In S1713, the key management apparatus 1c makes a comparison between the usage rights of the original encrypted document and a newly specified usage rights with reference to the usage rights set memory 13. If the new usage rights go beyond the usage rights of the original encrypted document, the key management apparatus 1c refuses to distribute encryption information in S1718.

If the new usage rights do not go beyond the usage rights of the original encrypted document, the key management apparatus 1c calls the key generator 14 to generate a new encryption key, and also calls the encrypted document identifier generator 15 to generate a new encrypted document identifier 411 in S1714. In S1715, the key management apparatus 1c stores in the usage rights memory 12 the new encrypted document identifier 411 and the usage rights set identifier received. In S1716, the key management apparatus 1c stores in the encryption key memory 11 the new encrypted document identifier 411 and the new encryption key. In S1717, the key management apparatus 1c sends the new encrypted document identifier 411, the new encryption key, and the network address of the key management apparatus 1c itself to the document terminal 3.

In S1703, the document terminal 3 receives the encrypted document identifier 411, the encryption key, and the address of the key management apparatus 1c. In S1705, the document terminal 3 encrypts document data using the encryption key received. In S1706, the document terminal 3 outputs encrypted document data with the attachment of the management information 41 that is generated by the encrypted document identifier 411 received and the address of the key management apparatus 1c received. In S1707, if the key management apparatus 1c refuses to distribute the encryption information, the document terminal 3 refuses to encrypt the document.

As described above, it is possible to hold the usage rights that are given to the information that is included in the encrypted document 4 through the editing and encryption as a new document.

Embodiment 3

In a third embodiment, a description will be given of a case where usage rights are managed independently by the unit of organization, type of document or the like.

Figure 12:
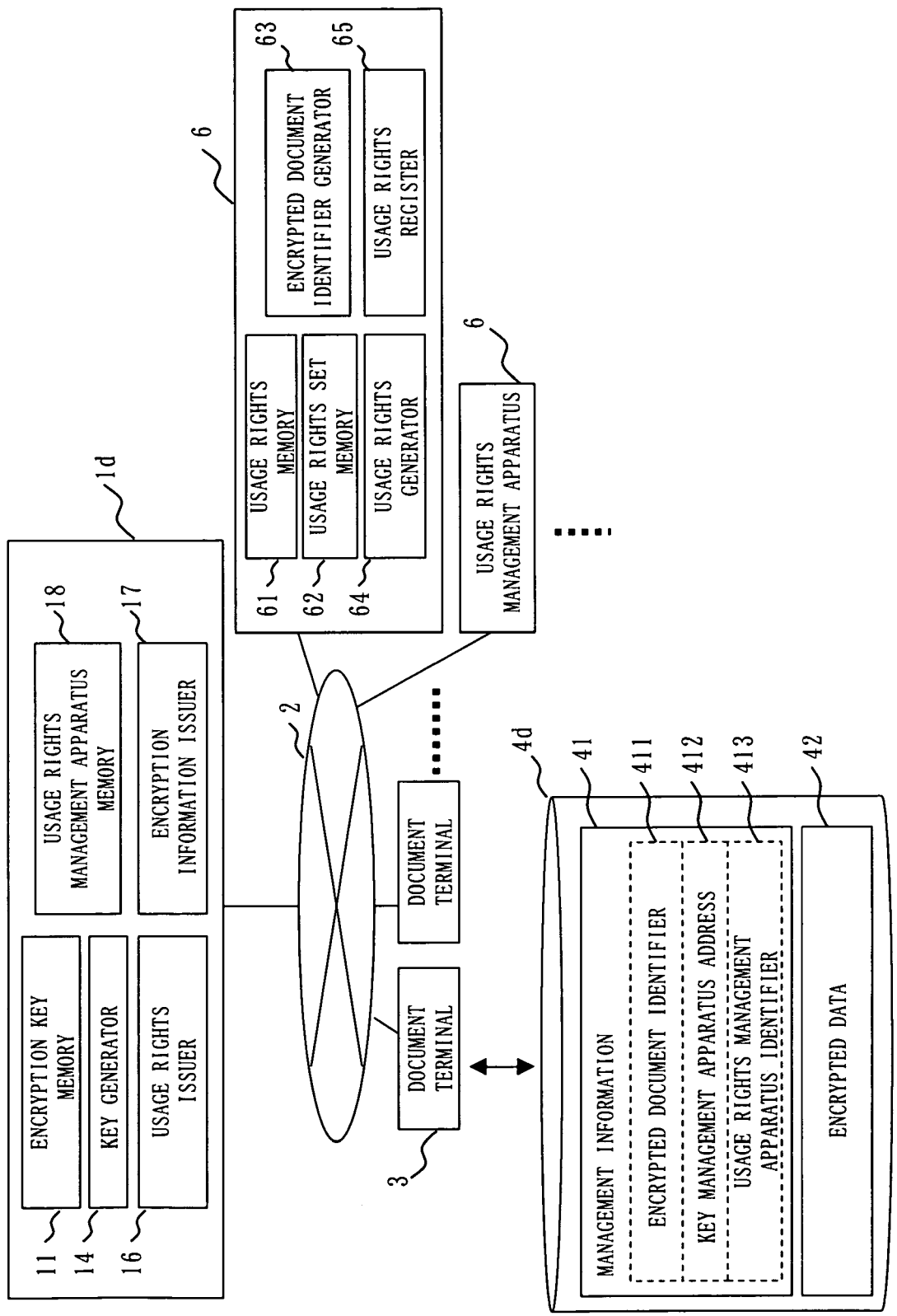
FIG. 12 is an overall view of a document security and editing system according to a third embodiment of the present invention illustrating element and terminal configurations thereof.

FIG. 12 is an overall view of a document security and editing system according to the third embodiment. The document security and editing system includes a key management apparatus 1d, a network 2, one or more document terminals 3, and one or more usage rights management apparatuses 6. The key management apparatus 1d, the usage rights management apparatuses 6 and the document terminals 3 are connected to each other over the network 2. The document terminal 3 is capable of inputting/outputting the encrypted document 4 that is distributed in an unspecified manner over the network 2, a storage medium or the like.

A configuration of the key management apparatus 1d will now be discussed in detail with reference to FIG. 12 and FIG. 13. FIG. 12 shows an internal configuration of the key management apparatus 1d. FIG. 13 shows an example of information that is stored in a usage rights management apparatus memory 18, which is a element of the key management apparatus 1d. The key management apparatus 1d includes an encryption key memory 11, a key generator 14, the usage rights management apparatus memory 18, a usage rights issuer 16, and an encryption information issuer 17. As shown in FIG. 13, the usage rights management apparatus memory 18 stores the identifier and network address of a usage rights management apparatus 6. The encryption key memory 11 is the same as that of FIG. 2, and therefore will not be elaborated here.

A configuration of the usage rights management apparatus 6 of FIG. 12 will now be discussed in detail. The usage rights management apparatus 6 includes a usage rights memory 61, a usage rights set memory 62, an encrypted document identifier generator 63, a usage rights generator 64, and an usage rights register 65. The usage rights memory 61 and the usage rights set memory 62 are the same as those of FIG. 2, and therefore will not be elaborated here. The document terminal 3 is also the same as that of FIG. 1, and therefore will not be elaborated here.

Figure 14:
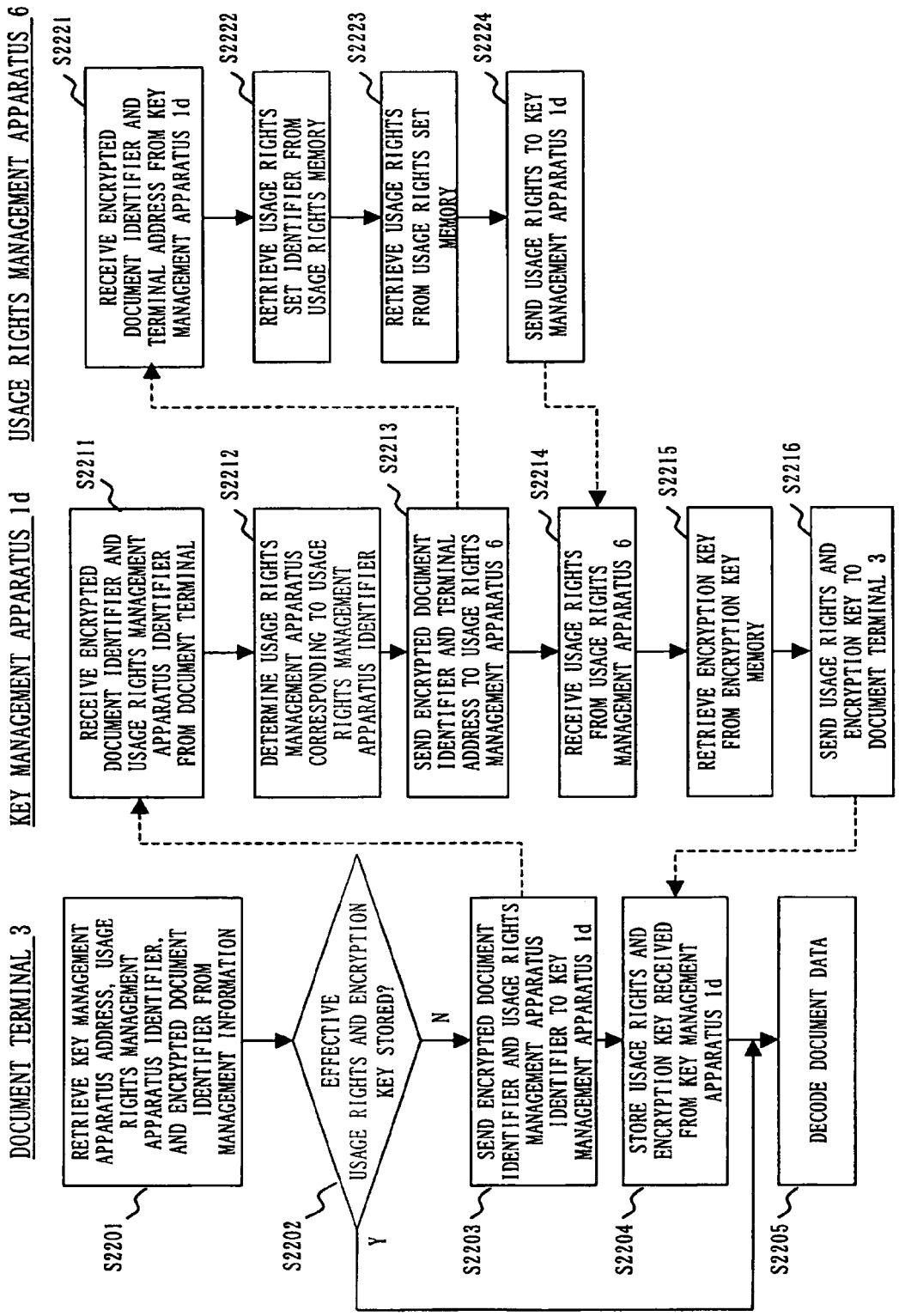
FIG. 14 is a flowchart illustrating an access operation to an encrypted document according to the third embodiment.

An access operation of an encrypted document will now be discussed with reference to FIG. 12 and FIG. 14. FIG. 12 also shows a configuration of an encrypted document 4d in detail. FIG. 14 is a flowchart illustrating operations of the key management apparatus 1d, the usage rights management apparatus 6, and the document terminal 3 for access to the encrypted document 4d.

With reference to FIG. 14, the document terminal 3 receives an access instruction from a user. Then, in S2201, a decoder 31 of the document terminal 3 retrieves an encrypted document identifier 411, a key management apparatus address 412, and a usage rights management apparatus identifier 413 from management information 41. In S2202, the decoder 31 examines whether or not usage rights and an encryption key corresponding to the encrypted document identifier 411 are stored in the document terminal 3. If effective usage rights and an encryption key are stored therein, the decoder 31 decodes document data by using the usage rights stored and the encryption key stored, and displays decoded document data in S2205. If there are neither effective usage rights nor an encryption key stored therein, the decoder 31 sends the encrypted document identifier 411 and the usage rights management apparatus identifier 413 to the key management apparatus 1d in S2203.

In S2211, the key management apparatus 1d receives the encrypted document identifier 411 and the usage rights management apparatus identifier 413 from the document terminal 3. In S2212, the key management apparatus 1d determines an address of a usage rights management apparatus 6 corresponding to the usage rights management apparatus identifier 413 received from the usage rights management apparatus memory 18. In S2213, the key management apparatus 1d sends the encrypted document identifier 411 and the address of the document terminal 3 (or a terminal address) to the usage rights generator 64 in the usage rights management apparatus 6.

In S2221, the usage rights generator 64 of the usage rights management apparatus 6 receives the encrypted document identifier 411 and the terminal address from the key management apparatus 1d. In S2222, the usage rights generator 64 retrieves from the usage rights memory 61 a usage rights set identifier corresponding to the encrypted document identifier 411 received. In S2223, the usage rights generator 64 also retrieves usage rights corresponding to the usage rights set identifier from the usage rights set memory 62, and sends the usage rights to the key management apparatus 1d.

In S2214, the key management apparatus 1d receives the usage rights from the usage rights management apparatus 6. In S2215, the key management apparatus 1d retrieves from the encryption key memory 11 an encryption key corresponding to the encrypted document identifier 411 received from the document terminal 3. In S2216, the key management apparatus 1d sends the encryption key with the attachment of the usage rights to the document terminal 3.

The document terminal 3 receives the usage rights and the encryption key from the key management apparatus 1d. In S2204, the document terminal 3 stores therein the usage rights and the encryption key received in correspondence to the encrypted document identifier 411. In S2205, the document terminal 3 decodes encrypted data 42 by using the encryption key received. Then, the document terminal 3 transfers decoded data to a display and editor 32. The display and editor 32 controls display and editing operations according to the usage rights.

Figure 15:
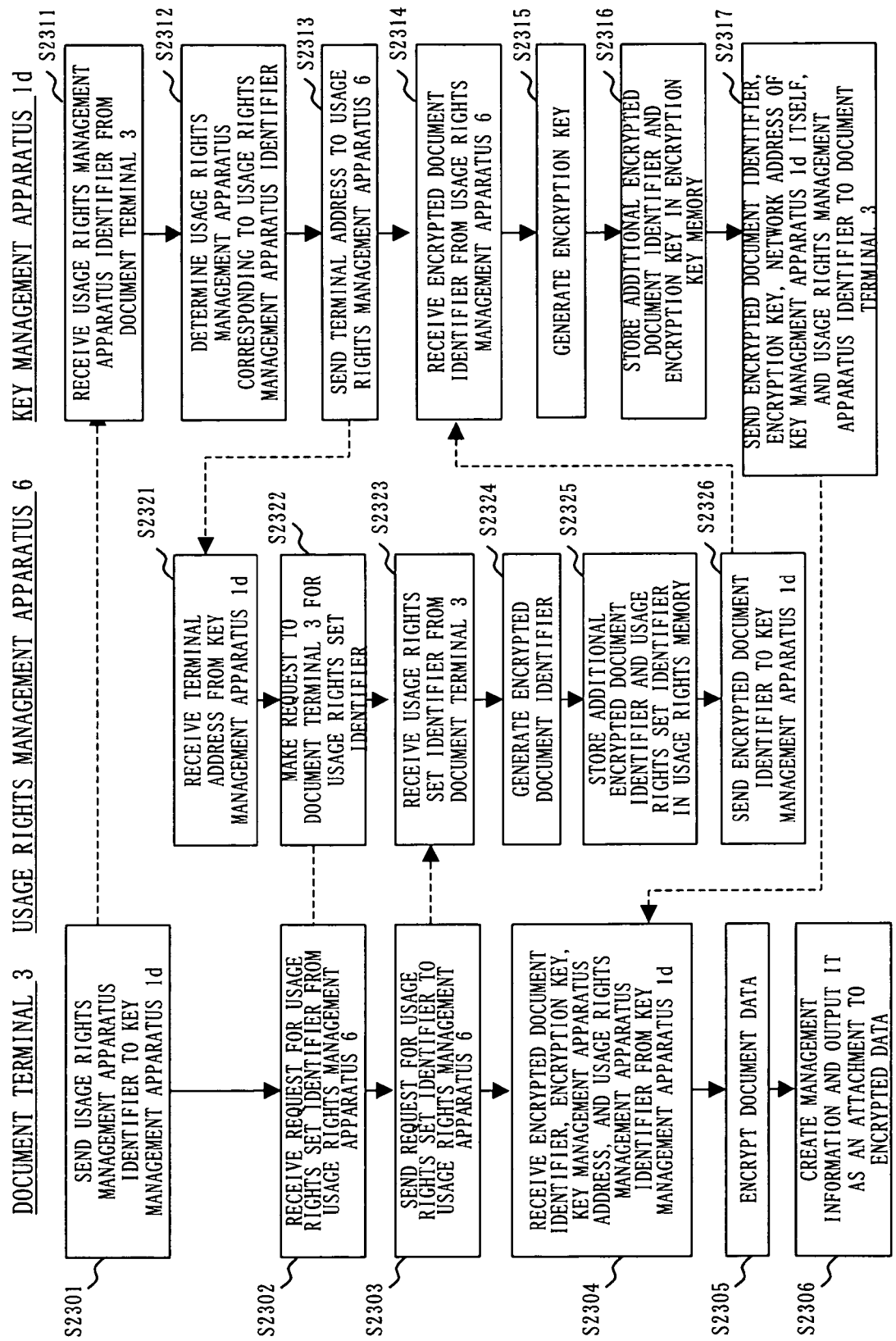
FIG. 15 is a flowchart illustrating an encryption operation of a document according to the third embodiment.

An encryption operation of a document will now be discussed with reference to FIG. 12 and FIG. 15. FIG. 15 is a flowchart illustrating operations of the key management apparatus 1d, the usage rights management apparatus 6, and the document terminal 3 for the encryption of a document.

The document terminal 3 receives an instruction to encrypt a document from a user. If edit rights are not given, the encryptor 33 prohibits encryption of a document. If edit rights are given, the encryptor 33 sends the usage rights management apparatus identifier 413 to the key management apparatus 1d in S2301.

In S2311, the key management apparatus 1d receives the usage rights management apparatus identifier 413 from the document terminal 3. In S2312, the key management apparatus 1d determines the address of the usage rights management apparatus 6 corresponding to the usage rights management apparatus identifier 413 received from the usage rights management apparatus memory 18. In S2313, the key management apparatus 1d sends the terminal address to the usage rights register 65 of the usage rights management apparatus 6.

The usage rights register 65 of the usage rights management apparatus 6 receives the terminal address from the key management apparatus 1d. Then, in S2322, the usage rights register 65 requests the document terminal 3 to send a usage rights set identifier.

The document terminal 3 receives the request. Then, in S2303, the document terminal 3 requests the user to specify the usage rights set identifier, and sends a specified usage rights set identifier to the usage rights management apparatus 6.

In S2323, the usage rights management apparatus 6 receives the usage rights set identifier. In S2324, the usage rights management apparatus 6 calls the encrypted document identifier generator 63 to generate a new encrypted document identifier. In S2325, the usage rights management apparatus 6 stores the new encrypted document identifier generated and the usage rights set identifier in the usage rights memory 61. In S2326, the usage rights management apparatus 6 sends the encrypted document identifier to the key management apparatus 1d.

In S2314, the key management apparatus 1d receives the encrypted document identifier. Then, in S2315, the key management apparatus 1d calls the key generator 14 to generate a new encryption key. In S2316, the key management apparatus 1d stores the encrypted document identifier and the new encryption key in the encryption key memory 11. In S2317, the key management apparatus 1d sends the encrypted document identifier, the encryption key, the network address of the key management apparatus 1d itself, and the usage rights management apparatus identifier 413 to the document terminal 3.

In S2304, the document terminal 3 receives the encrypted document identifier, the encryption key, the network address of the key management apparatus 1*d*, and the usage rights management apparatus identifier 413 from the key management apparatus 1*d*. In S2305, the document terminal 3 encrypts document data by using the encryption key received. In 2306, the document terminal 3 outputs the document data encrypted with the attachment of the management information 41 generated by the encrypted document identifier received, the network address of the key management apparatus 1*d* received, and the usage rights management apparatus identifier 413 received to a storage device and the like.

As discussed above, usage rights are thus controlled by a plurality of usage rights management apparatuses 6. This allows achieving an independent control of usage rights by the unit of organization, type of document or the like.

It should be noted that for many communication protocols, such as URL of the HTTP protocol, a plurality of network addresses can be allocated to one device. With this type of communication protocols, the usage rights issuer 16 and the encryption information issuer 17 of the key management apparatus 1*d* may be provided with network addresses corresponding to individual usage rights management apparatuses 6.

If the key management apparatus 1*d* is configured as above, the address of the key management apparatus itself acts as the usage rights management apparatus identifier 413.

Within the descriptions set forth above in this embodiment, the user specifies the usage rights management apparatus 6 to be used for the encryption of a document. Here, however, is another example in which the usage rights management apparatus 6 for use is automatically specified by a user group to which a document creator belongs.

FIG. 16 is an example of information that is stored in another usage rights management apparatus memory 18*e* according to this embodiment. Other elements of a key management apparatus 1*e* are the same as those of the key management apparatus 1*d* of FIG. 12, and therefore will not be elaborated here. The key management apparatus 1*e* receives a user identifier (individual ID) that is entered by a user, and a user group determiner 18*b'* detects and identifies a group ID as a user group identifier based on the user identifier (individual ID). It should be noted that the user group determiner 18*b'* is not shown in FIG. 12 but is the same as that included in the key management apparatus 1*b* of FIG. 5.

Figure 17:
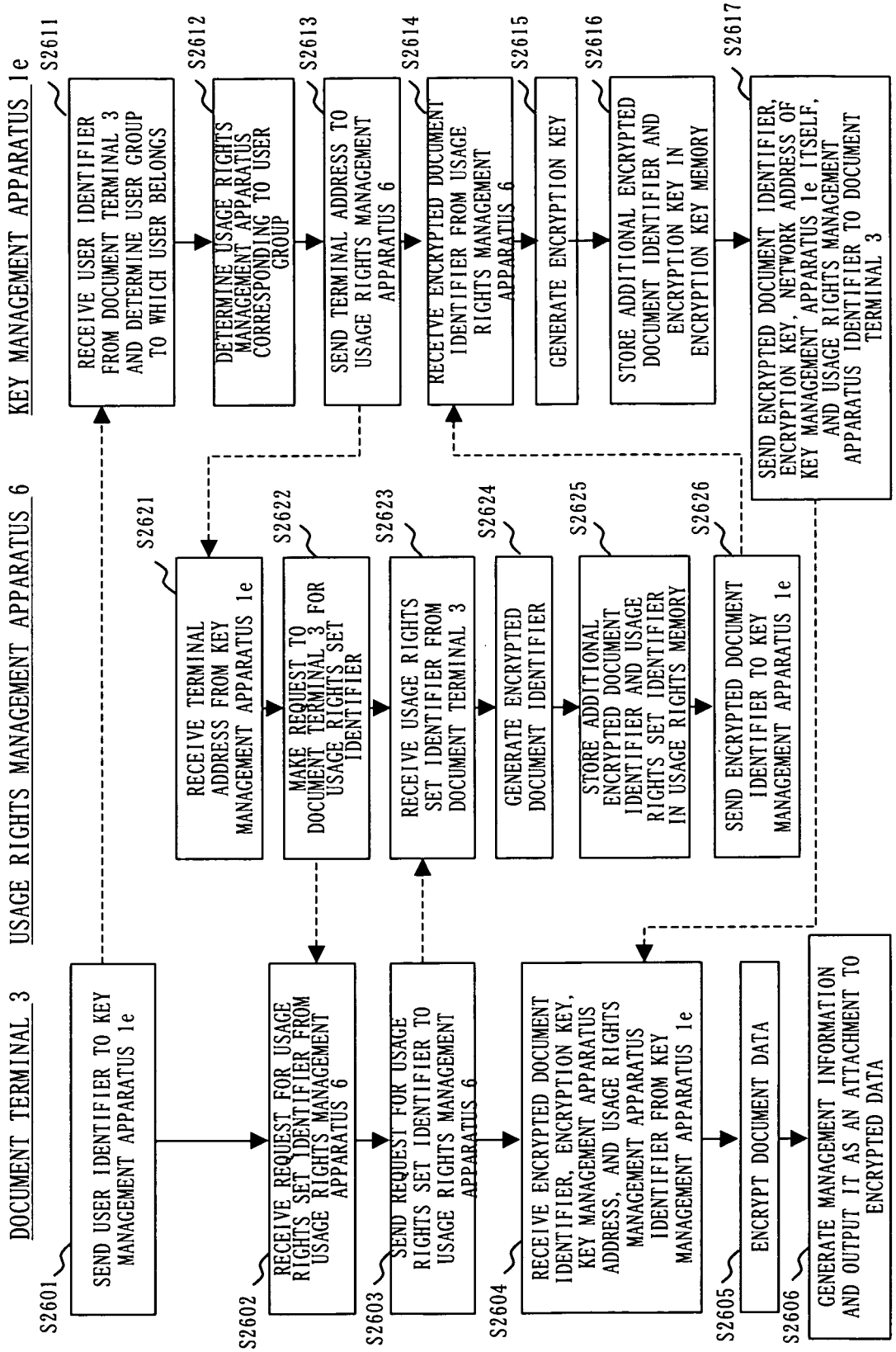
FIG. 17 is a flowchart illustrating another encryption operation of a document according to the third embodiment.

An encryption operation of a document will now be discussed with reference to FIG. 17. FIG. 17 is a flowchart illustrating operations of the key management apparatus 1*e*, the usage rights management apparatus 6, and the document terminal 3 for the encryption of a document.

The encryptor 33 of the document terminal 3 receives an instruction to encrypt a document from a user. If edit rights of the encrypted document 4 are not given, then the encryptor 33 prohibits encryption of the document. If edit rights of the document, the encryptor 33 requests the user to specify the document class, and sends the document class specified to the key management apparatus 1*e* in S2601.

In S2611, the key management apparatus 1*e* receives the user identifier of the document creator from the document terminal 3, transfers the user identifier received to the user group determiner 18*b'*, and obtains the user group identifier to which the document creator belongs in return. In S2612, the key management apparatus 1*e* determines the address of the usage rights management apparatus 6 corresponding to the user group identifier in the usage rights management apparatus memory 18*e*. In S2613, the key management apparatus 1*e* sends the terminal address to the usage rights register 65 of the usage rights management apparatus 6.

In S2621, the usage rights register 65 receives the terminal address from the key management apparatus 1*e*. Then, in S2622, the usage rights register 65 makes a request to the document terminal 3 for the usage rights set identifier.

In S2302, the document terminal 3 receives the request. Then, the document terminal 3 requests the user to specify the usage rights set identifier, receives the usage rights set identifier specified from the user. In S2303, the document terminal 3 sends the usage rights set identifier specified to the usage rights management apparatus 6.

In S2623, the usage rights management apparatus 6 receives the usage rights set identifier. Then, in S2624, the usage rights management apparatus 6 calls the encrypted document identifier generator 63 to generate a new encrypted document identifier. In S2625, the usage rights management apparatus 6 stores the newly generated encrypted document identifier and the usage rights set identifier in the usage rights memory 61. Then, in S2626, the usage rights management apparatus 6 sends the encrypted document identifier to the key management apparatus 1*e*.

In S2614, the key management apparatus 1*e* receives the encrypted document identifier. Then, in S2615, the key management apparatus 1*e* calls the key generator 14 to generate a new encryption key. In S2616, the key management apparatus 1*e* stores the encrypted document identifier and the encryption key in the encryption key memory 11. In S2617, the key management apparatus 1*e* sends the encrypted document identifier, the encryption key, the network address of the key management apparatus 1*e* itself, and the usage rights management apparatus identifier 413 to the document terminal 3.

In S2604, the document terminal 3 receives the encrypted document identifier, the encryption key, the network address of the key management apparatus 1*e* itself, and the usage rights management apparatus identifier 413 from the key management apparatus 1*e*. In S2605, the document terminal 3 encrypts document data by using the encryption key received. In S2606, the document terminal 3 outputs document data encrypted to a storage device or the like with the attachment of the management information 41 that is generated from the encrypted document identifier, the network address of the key management apparatus 1*e*, and the usage rights management apparatus identifier 413.

As described above, the usage rights management apparatus 6 has a constant correspondence with a department to which a document creator belongs or the like. Therefore, if the usage rights to the encrypted document 4 is controlled by the usage rights management apparatus 6, the usage rights can be managed easily by the department of document creation or the like.

In addition, the network address of a user terminal can be used as the user identifier, and a network mask can be used as the user group identifier. Therefore, a flexible control of the usage rights is allowed based on the physical arrangement of the document terminal 3. If this configuration is applied, the user identifier does not need to be sent from the document terminal 3 to the key management apparatus 1*e*.

Embodiment 4

With the foregoing embodiments, it is a prerequisite that the key management apparatus is connected to the document security and editing system in order to store a document to be encrypted.

According to a fourth embodiment, an encrypted document 4 is taken out temporarily to an environment to which the key management apparatus is not connected so as to be edited and stored.

Figure 19:
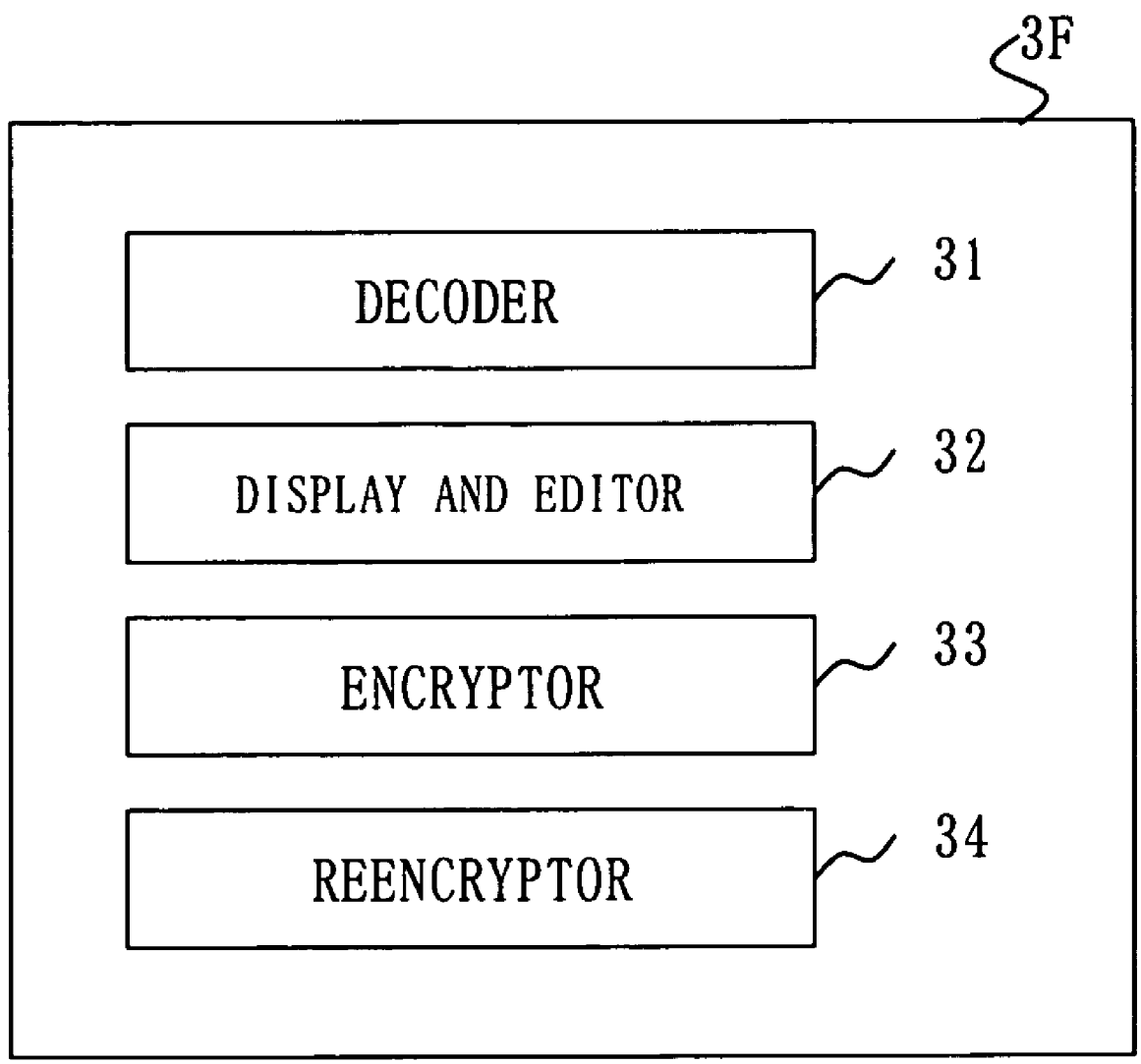
FIG. 19 is a block diagram of a document terminal according to the fourth embodiment.

FIG. 18 shows an example of information that is stored in a usage rights set memory 13$f$. FIG. 19 is a block diagram of a document terminal 3$f$. The usage rights set memory 13$f$ includes usage rights set identifiers that are used for export purposes when a document is taken out of office. The key management apparatus and the document terminal of this embodiment are the same as those of the foregoing embodiments, and therefore will not be elaborated here.

Figure 20:
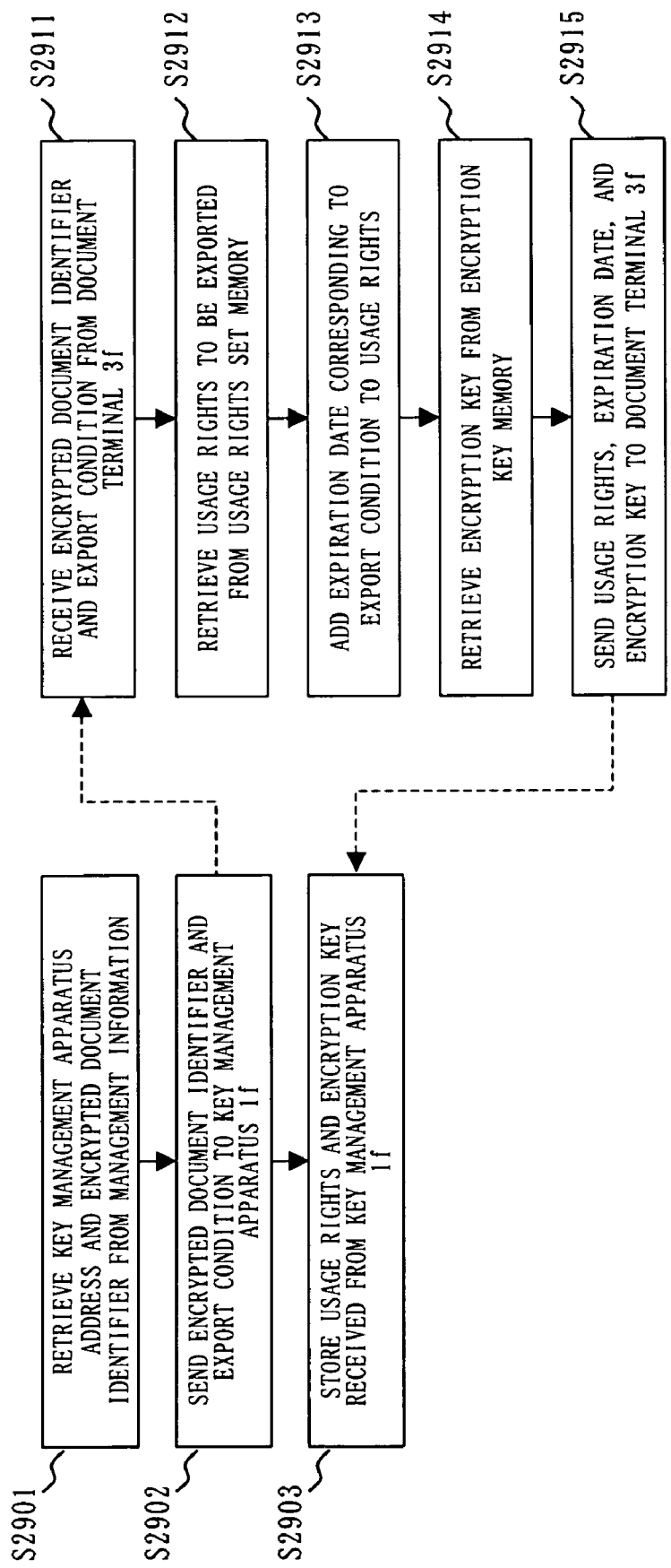
FIG. 20 is a flowchart illustrating an export operation of a document according to the fourth embodiment.

An export operation of an encrypted document will now be discussed with reference to FIG. 20. FIG. 20 is a flowchart illustrating operations of a key management apparatus 1$f$ and a document terminal 3$f$ for taking a document out of office.

The document terminal 3$f$ receives an instruction from a user to export a document. Then, in S2901, the document terminal 3$f$ retrieves an encrypted document identifier 411 and a key management apparatus address 412 from management information 41. In S2902, the document terminal 3$f$ requests the user to specify an export condition, and then sends an export condition entered and an encrypted document identifier to the key management apparatus 1$f$. The following describes another example in which the number of days to allow a document out of office is specified as the export condition.

The key management apparatus 1$f$ receives the export condition and the encrypted document identifier in S2911. In S2912, the key management apparatus 1$f$ retrieves usage rights for export from the usage rights set memory 13$f$. In S2913, the key management apparatus 1$f$ adds to the retrieved usage rights an expiration date corresponding to the export condition received. In this example, the expiration date is set to expire after the number of days when the document is allowed out of office from the date of reception of the export condition from the document terminal 3$f$. In S2914, the key management apparatus 1$f$ retrieves an encryption key corresponding to the encrypted document identifier from the encryption key memory 11. In S2915, the key management apparatus 1$f$ sends the encryption key to the document terminal 3$f$ with the attachment of the usage rights with the expiration date.

In S2903, the document terminal 3$f$ receives the usage rights with the expiration date and the encryption key from the key management apparatus 1$f$, and stores therein the usage rights and the encryption key received in correspondence to the encrypted document identifier.

A storage operation that is performed while the encrypted document is out of office will now be discussed with reference to FIG. 21. FIG. 21 is a flowchart illustrating an operation of a reencryptor 34 of the document terminal 3$f$.

With referring to the figure, the reencryptor 34 of the document terminal 3$f$ receives an instruction from a user to store a document. Then, the reencryptor 34 obtains from a decoder 31 management information 41 and the encryption key that was used to decode the document to be stored in S3001. In S3002, the reencryptor 34 encrypts document data by using the encryption key obtained. In S3003, the reencryptor 34 outputs the document data encrypted with the attachment of the management information 41 obtained to a storage device or the like.

As described above, a document encrypted in office can thus be temporarily taken out of office and edit the encrypted document with security of information in the document.

Embodiment 5

With the foregoing embodiments, a user who is not given edit rights is not allowed any change to the form of display of the encrypted document. According to a fifth embodiment of the present invention, however, a user is allowed to edit an encrypted document, but prohibited from storing an edited result.

The document terminal 3 of this embodiment is configured the same as that of FIG. 1. However, the encryptor 33, if given no rights to store an encrypted document, refuses to output an encrypted document. Other elements of the document terminal 3 of this embodiment are the same as those discussed in the first embodiment, and therefore will not be elaborated here.

An operation of the document terminal 3 will now be discussed in a case where the document terminal 3 is given usage rights that allows editing but prohibits storing.

A display and editor 32 of the document terminal 3 is given edit rights like the display and editor 32 of the foregoing embodiments. Therefore, the display and editor 32 allows an editing operation. However, the encryptor 33 is not given the right to store, and therefore the encryptor 33 refuses to output an edited result as the encrypted document.

As described above, a document is allowed to be edited in the document terminal 3 but an edited result is not allowed to be outputted as an encrypted document. This allows editing operations necessary for use of information in documents such as tabulated document sorting and aggregate data calculation, but prohibits edited results from being stored.

Embodiment 6

According to the foregoing embodiments, the descriptions were given in the assumption that the respective elements are configured with hardware installing software or firmware. Alternatively, however, the embodiments may be implemented by steps performed by a general purpose computer that simulates the functions of the individual elements.

This allows obtaining the same characteristics of the individual embodiments discussed above.

With further reference to the foregoing embodiments, the descriptions were given in the assumption that the key management apparatus, the document terminal, the encrypted document and other devices and units are connected to a network. Alternatively, however, the key management apparatus may have its own storage device that stores encrypted documents, or other devices. Still alternatively, the key management apparatus may even include one of the document terminals.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A key management apparatus comprising:
   an encryption key memory that stores an encrypted document identifier of an encrypted document and a first encryption key, the first encryption key being configured for use in decoding the encrypted document, the encrypted document identifier and the encryption key corresponding to each other; and
   one or more computer processors programmed to execute:
     a user group determining function that determines the usage rights of users for the encrypted document, a usage rights issuing function that, in response to receiving a read request using the encrypted document identifier transmitted from a remote terminal by a user who is determined to have usage rights to read the encrypted document by the user group determining function, performs the following:
  refers to the encryption key memory and a usage rights set memory, wherein the usage rights memory stores the usage rights for the encrypted document in correspondence with the encrypted document identifier, and
  sends the usage rights corresponding to the encrypted document identifier and the first encryption key to the remote document terminal from which the read request is received, and
an encryption information issuing function that, in response to receiving an edit request using the encrypted document identifier transmitted from a remote terminal by a user who is determined to have usage rights to edit the encrypted document by the user group determining function, performs the following:
  refers to the encryption key memory and the usage rights set memory,
  instructs to generate an identifier of a document to be encrypted,
  instructs to generate a second encryption key, the second encryption key being different than the first encryption key,
  stores the generated identifier and the second encryption key in the encryption key memory and the usage rights set memory, respectively, and
  sends the generated identifier, the first encryption key, and the second encryption key to the remote terminal from which the edit request is received,
wherein:
  the edit request is a request to edit the encrypted document, and
  the second encryption key is configured for use by the remote terminal from which the edit request is received to encrypt a document generated as a result of: decoding the encrypted document, and editing the decoded document.

2. The key management apparatus according to claim 1, wherein the user group determining function determines availability of read rights and edit rights based on user qualification.

3. The key management apparatus according to claim 1, further comprising a usage rights register that receives a correspondence between an external encrypted document and external usage rights, generates an identifier of the external encrypted document received, and registers a generated identifier in the usage rights set memory.

4. The key management apparatus according to claim 1, further comprising a usage rights management apparatus memory that stores a user group identifier,
  wherein the usage rights set memory is independent of the key management apparatus, the usage rights set memory being located in a separate usage rights management apparatus that corresponds to a user group
  wherein the key management apparatus receives one of the read request and the edit request that uses the encrypted document identifier from a user who is given the usage rights set by the user group determining function, refers to the encryption key memory and the usage rights management apparatus, instructs to generate the identifier of the document to be encrypted and the second encryption key of the document to be encrypted in a case of the edit request, and sends the usage rights corresponding to the encrypted document identifier and the first encryption key to the terminal from which the one of the read request and the edit request is received.

5. A document security and editing system, comprising a key management apparatus and a document terminal, the key management apparatus and document terminal being remote from one another,
  the key management apparatus including:
    an encryption key memory that stores an encrypted document identifier of an encrypted document and a first encryption key of the encrypted document, the first encryption key being configured for use in decoding the encrypted document, the encrypted document identifier and the encryption key corresponding to each other; and
    one or more computer processors programmed to execute:
      a user group determining function that determines the usage rights of users for the encrypted document,
      a usage rights issuing function that, in response to receiving a read request using the encrypted document identifier transmitted from the document terminal by a user who is determined to have usage rights to read the encrypted document by the user group determining function, performs the following:
        refers to the encryption key memory and a usage rights set memory, wherein the usage rights memory stores the usage rights for the encrypted document in correspondence with the encrypted document identifier, and
        sends the usage rights corresponding to the encrypted document identifier and the first encryption key to the document terminal from which the read request is received, wherein the usage rights set memory stores the encrypted document identifier and usage rights, and
      an encryption information issuing function that, in response to receiving an edit request using the encrypted document identifier transmitted from the document terminal by a user who is determined to have usage rights to edit the encrypted document by the user group determining function, performs the following:
        refers to the encryption key memory and the usage rights set memory,
        instructs to generate an identifier of a document to be encrypted,
        instructs to generate a second encryption key, the second encryption key being different than the first encryption key,
        stores the generated identifier and the second encryption key in the encryption key memory and the usage rights set memory, respectively, and
        sends the generated identifier, the first encryption key, and the second encryption key to the document terminal from which the edit request is received, and
  the document terminal including:
    a decoder that decodes the encrypted document by the first encryption key received from the key management apparatus in response to transmitting the read request or the edit request;

a display that displays the document decoded by the decoder;

an editor which is used to edit the decoded document by the user determined to have usage rights to edit the encrypted document, and an encryptor that encrypts the edited decoded document using the second encryption key obtained from the key management apparatus in response to transmitting the edit request.

6. The document security and editing system according to claim 5, wherein the document terminal makes a request to the key management apparatus for the first encryption key if the encryption key corresponding to the encrypted document is unavailable, obtains the first encryption key, and decodes the encrypted document by the first encryption key.

7. The document security and editing system according to claim 5, wherein the document terminal includes a reencryptor that makes a request to the key management apparatus for edit rights, obtains the edit rights, and encrypts the decoded document edited based on the edit rights obtained.

8. A key management method performed using a key management apparatus including an encryption key memory and at least one computer processor, the method comprising:

storing in the encryption key memory, an encrypted document identifier of an encrypted document and a first encryption key of the encrypted document, the encrypted document identifier and the encryption key corresponding to each other;

storing in a usage rights set memory, the encrypted document identifier and usage rights, the encrypted document identifier and the usage rights corresponding to each other; and utilizing the at least one computer processor to perform the following:

determine the usage rights of users with respect to the encrypted document, in response to receiving a read request using the encrypted document identifier transmitted from a remote terminal by a user who is determined to have usage rights to read the encrypted document, perform the following:

refer to the encryption key memory and the usage rights set memory, and send the usage rights corresponding to the encrypted document identifier and the first encryption key to the remote terminal of the user from which the read request is received, and in response to receiving an edit request using the encrypted document identifier transmitted from a remote terminal by a user who is determined to have usage rights to edit the encrypted document, perform the following:

refer to the encryption key memory and the usage rights set memory, instruct to generate an identifier of a document to be encrypted, instruct to generate a second encryption key, the second encryption key being different than the first encryption key, store the generated identifier and the second encryption key in the encryption key memory and the usage rights set memory, respectively, and send the generated identifier and the second encryption key to the remote terminal from which the edit request is received, wherein;

the edit request is a request to edit the encrypted document, the second encryption key is configured for use by the remote terminal from which the edit request is received to encrypt a document generated as a result of: decoding the encrypted document, and editing the decoded document.

9. The key management method according to claim 8, further comprising utilizing the at least one computer processor to determine availability of read rights and edit rights based on user qualification.

10. The key management method according to claim 8, further comprising utilizing the at least one computer processor to: receive a correspondence between an external encrypted document and external usage rights, generate an identifier of the external encrypted document received, and register a generated identifier in the usage rights set memory.

11. The key management method according to claim 8, further comprising utilizing the at least one computer processor to: make a request for the first encryption key if the encryption key corresponding to the encrypted document is unavailable, obtain the first encryption key, and decode the encrypted document by the first encryption key obtained.

12. The key management method according to claim 8, further comprising utilizing the at least one computer processor to: make a request for edit rights, obtain the edit rights, and encrypt the decoded document edited based on the edit rights obtained.

13. The key management method according to claim 8, further comprising utilizing the at least one computer processor to: decode the encrypted document in the terminal by using the first encryption.

14. The key management apparatus according to claim 1, further comprising the usage rights set memory.

15. The document security and editing system according to claim 5, wherein the key management apparatus further comprises the usage rights set memory.

16. The document editing and security system according to claim 5, further comprising:

a usage rights management apparatus comprising the usage rights set memory, the usage rights management apparatus corresponding to a user group, wherein the key management apparatus further comprises a usage rights management apparatus memory that stores a user group identifier, and wherein the key management apparatus receives one of the read request and the edit request that uses the encrypted document identifier from the user who is given the usage rights set by the user group determining function, refers to the encryption key memory and the usage rights management apparatus, instructs to generate the identifier of the document to be encrypted and the second encryption key in a case of the edit request, and sends the usage rights corresponding to the encrypted document identifier and the first encryption key to the terminal from which the one of the read request and the edit request is received.

17. The key management method according to claim 8, wherein the key management apparatus further includes the usage rights set memory.

18. The key management method according to claim 8, wherein the key management apparatus further includes a usage rights management apparatus memory in the key management apparatus that stores a user group identifier, wherein the usage rights set memory is independent of the key management apparatus, the usage rights set memory being located in a separate usage rights management apparatus that corresponds to a user group, and
wherein the method further comprises:
after receiving one of the read request and the edit request that uses the encrypted document identifier from the user who is given the usage rights set by the user group determining function, utilizing the at least one computer processor to read the usage rights management apparatus memory in order to refer to the usage rights set memory of the usage rights management apparatus corresponding to the user group of which the user is a member.

* * * * *